United States Patent [19]

Schutz

[11] Patent Number: 5,594,841
[45] Date of Patent: Jan. 14, 1997

[54] STEREOGRAM AND METHOD OF CONSTRUCTING THE SAME

[76] Inventor: Stephen A. Schutz, 7910 Ivanhoe, Suite 436, LaJolla, Calif. 92037

[21] Appl. No.: 175,054

[22] Filed: Dec. 27, 1993

[51] Int. Cl.[6] ................................................ G06T 15/00
[52] U.S. Cl. ........................ 395/119; 351/203; 359/462
[58] Field of Search ........................... 395/119; 351/203; 359/462

[56] References Cited

U.S. PATENT DOCUMENTS

| 4,135,502 | 1/1979 | Peck ...................................... 128/76.5 |
| 5,204,944 | 4/1993 | Wolberg et al. ........................ 395/127 |
| 5,371,627 | 12/1994 | Baccei et al. ........................... 359/462 |

OTHER PUBLICATIONS

Tyler, C. W. et al., "The Autostereogram." *The Society of Photo–Optical Instrumentation Engineers* (SPIE). vol. 1256: 182–197 Feb. (1990).
Games "Look, Ma, No Glasses," Apr. 12–15 (1992).
3d Pixelgram by digi–rule, mini–series "Seal with a Kiss!" 1993Digi–Rule, Inc. Calgery, Canada, 1 page (1993).
Melanie Carr "Childern 'Round the World/East" 3D Art, N. E. Thing Enterprises, Southern Stock, Uniphoto Press International (1993).
Baccei, Tom and Smith, Cheryl "N. E. Thing Fabulous 1993 3D Calendar" N. E. Thing Enterprises, Cambridge, MA (1991).
Brelinski, M. "Dolphin's Song" NVision Grafix, Inc. Dallas Texas (1993).
Meilach, Dona Z. "Giving Life–like Dimension to Computer Graphics with 3–D Stereo Systems." *Computer Pictures* 11:44–46 (1993).
Slinker et al. "The Generation And Animation of Random Dot And Ramdon Live Autostereograms", Journal of imaging Science And Technology, vol. 36, No. 3, May/Jun. 1992, pp. 260–267.

*Primary Examiner*—Mark K. Zimmerman
*Attorney, Agent, or Firm*—Campbell & Flores

[57] ABSTRACT

A bare eyed stereogram based on continuous tone, non-random dot art and a process for making the stereogram. A computer implemented process for making the stereogram uses a computer system having a central processing unit, memory, storage, a user interface, an edit program and display means. The art is input to the system in the form of repeating bands of picture elements in a stereogram base. The picture elements have assigned information, and depth information as well. Below a threshold value, new information is assigned by the method of smear. At or above the threshold value, information is provided by a number of techniques which import the information values of picture elements outside the stereogram base. Preferably some of the information is color information and the external color information values are altered to blend with colors in the surrounding base. A process for making a stereogram with wide repeating bands that can be viewed at a distance is shown. A stepping procedure for creating stereograms and a method of superimposing multiple stereograms is shown.

14 Claims, 25 Drawing Sheets

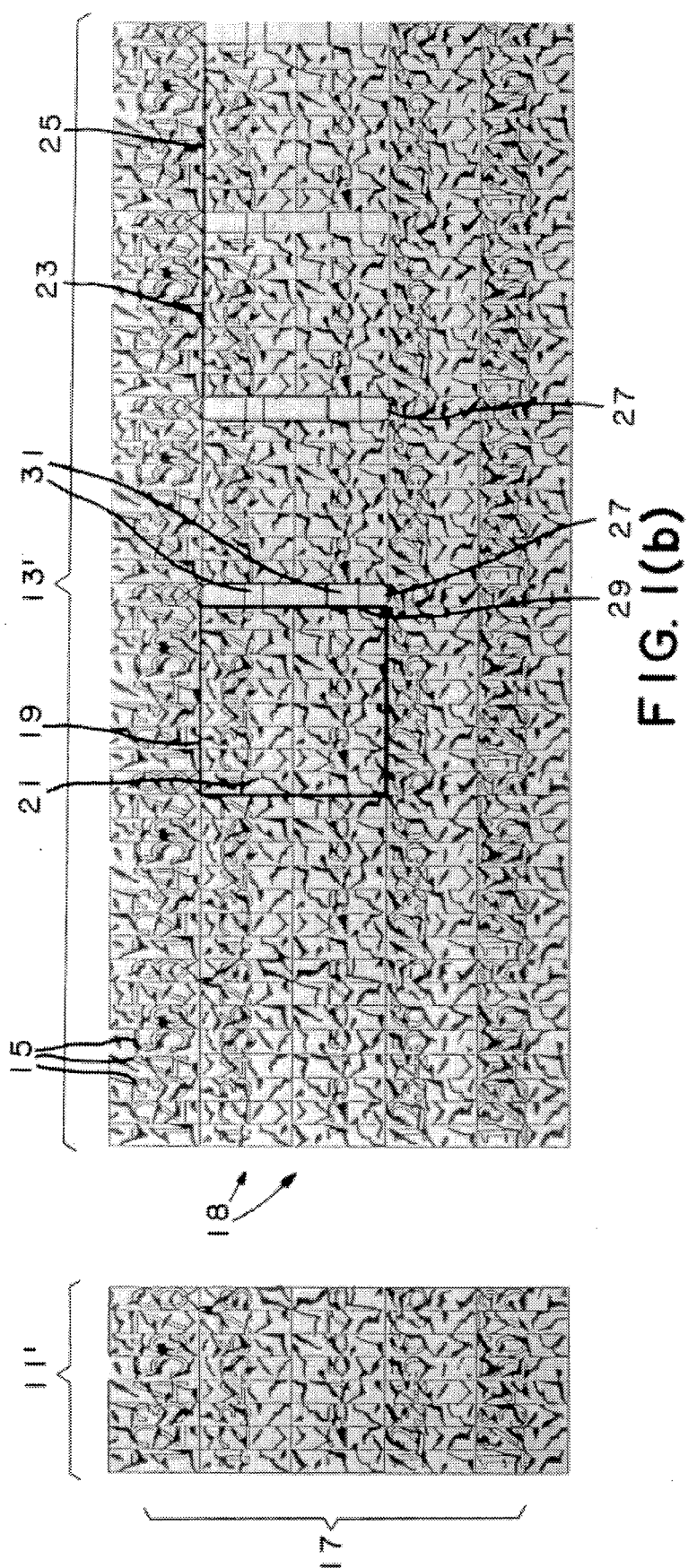
FIG. I(b)

INPUT STRIP OF FULL COLOR ART:
This art is scanned into a computer graphics file.
The RGB 24 bit color format is used, although other formats can be used.
PARAMXR2=width of strip in pixels (must be > IXR1, the repeat width) IY=height of strip in pixels.
For each pixel row from y=0 to IY-1, IDFN(x) is defined in the range from x=0 to x=PARAMXR2-1 as a sequence of three numbers, each from 0 to 255, representing the value of red(R), green(G) and blue(B). If seams are to be avoided in the final art, it is necessary to match the color of the pixel at x=0 to the color of the pixel at x=IXR1-1 (for every y). This must be done by an artist by cutting and pasting (and blending if necessary) using any standard graphics editor.
NOTE: Alternatively, from x=0 to x=IXR1-1, the original art can be repeated to the right after it is mirror imaged (i.e., flipped across a vertical line) then PARAMXR2=2*IXR1

37

CREATE BASE ART:
Create base art by repeating the left side of the strip art (from x=0 to x=IXR1-1) side by side up to max width of IXD pixels, for each value of y from y=0 to y=IY-1. For each y, there is a color, IFN(x), defined for each x. IXD=width of output art in pixels.

INPUT DEPTH CONTOUR INFO:
This is composed as a 256 tone grey scale picture. Complicated shapes must be inputed using a specialized 3-D scanner (the numerical depth info can be converted to a grey-scale by a conversion program), but simpler forms can be created by a program utilizing an equation or simply drawn by an artist in a standard graphics program. For each pixel from y=0 to IY-1 (the height of the final art) and from x=0 to IXD-IXR1 (the width of the final art), a value of grey-scale Z is defined in the range from 0 to 255. The max raised level is defined as 255, the base art level is 128 and the max recessed level is 0.
If more than 128 raised levels are desired and there are no recessed levels, the base art level can be defined as 0 and the maximum raised level as 255. (If more than 255 levels are desired, an RGB picture can be used in which 256 values of G represent raised levels and 256 values of R represent recessed levels resulting in 512 levels. Further combinations using B can be constructed for more than 512 levels.)
A parameter S must also be inputed, representing the maximum depth displacement as a fraction of repeat width (typically .1 to .4).

— 39

COMPUTE MAXIMUM NUMBER OF LEVELS:
Use the formula: MAXLevel= Integer[2*S*IXR1] where S is an inputed parameter and IXR1 is the repeat width.

— 43

COMPUTE LEVEL AT EACH PIXEL:
In region from x>=IXR1 to IXD.
 IFCN(x)=RoundedInteger([Z(x-IXR1)/255]*MAXLevel)
In region from x=0 to x=IXR1-1
 IFCN(x)=MAXLevel/2
NOTE: The region from x=0 to x=IXR1-1 is normally cropped off at the end of the procedure. Therefore the above assignment in this region might appear to be arbitrary. However, it is used in the procedure that follows. Above, we use the convention that this region is at a base level of MAXLevel/2, but other conventions could be used and other value for IFCN(x) could be inserted in this region.

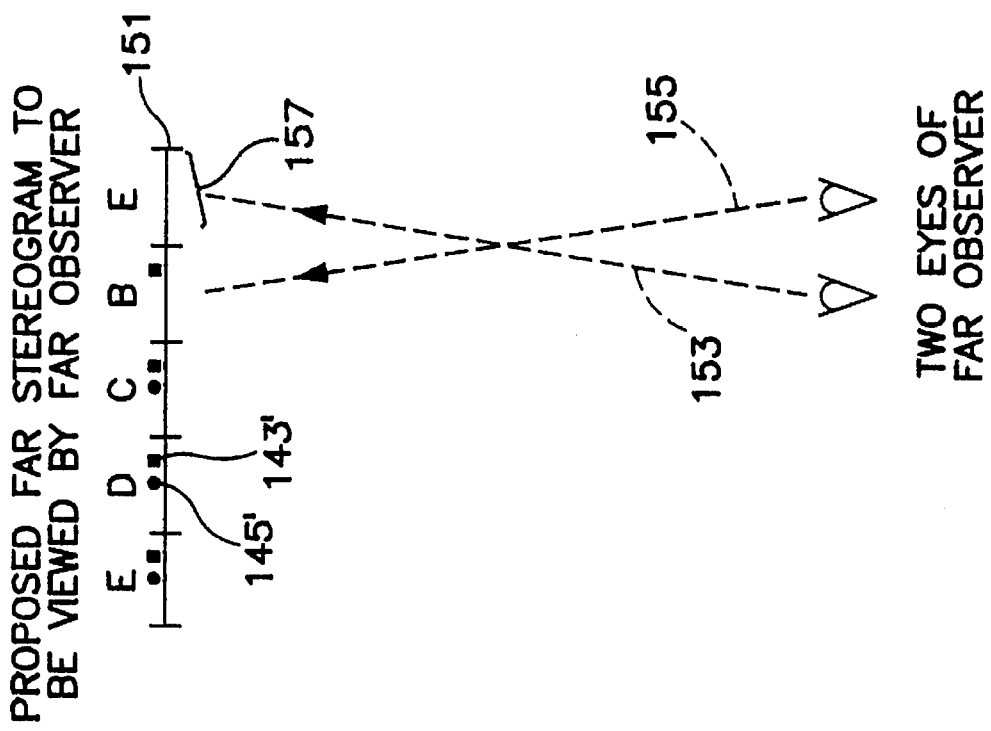
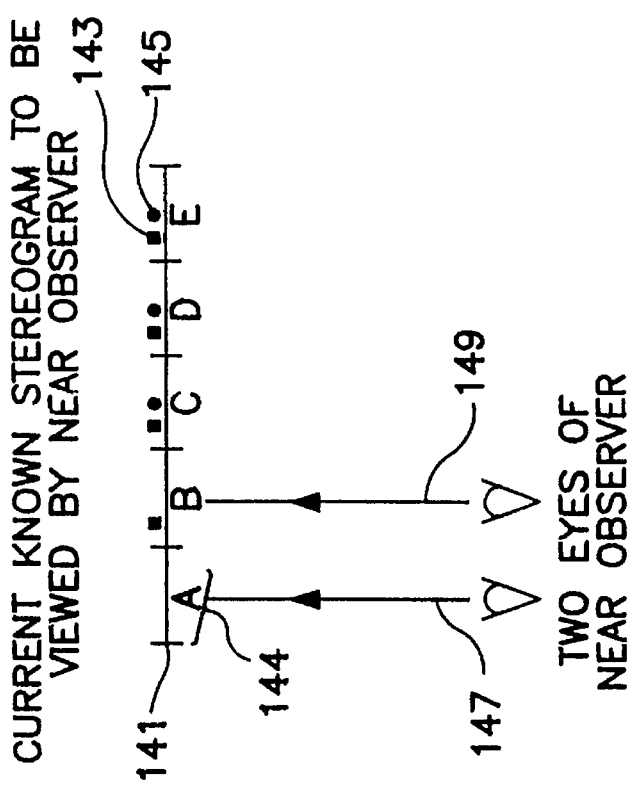
FIG. 8B
FIG. 8A 353 354

353 354

STEREOGRAM AND METHOD OF CONSTRUCTING THE SAME

The present invention relates to a method for making stereograms, and to stereograms so produced. Stereograms are designs or illustrations of two-dimensional base art, which may initially appear flat but, upon appropriate inspection, give the illusion of having three-dimensional shapes and forms embedded therein. The stereograms produced by the present invention can be viewed without using lenses or other aids and are, therefore, referred to as bare-eyed stereograms. Raised and/or lowered images appear within the design so that a depth effect is achieved. More particularly, the invention relates to stereograms created from art which is in the form of continuous tone artwork. The term "continuous tone artwork" shall be used herein to refer to any non-random dot artwork, e.g., a picture, painting or photograph, including line art which is art that lacks graduated tones. The invention further relates to a method of making such stereograms.

The method of the invention is especially well-suited to creation of stereograms which can be reproduced and electronically manipulated by image processing means. The invention involves an improved means of dealing with the dislocations or gaps which occur in the stereogram in the process of forming the "raised" and "lowered" sections mentioned above.

Also disclosed is a method of creating for stereograms for viewing by observers located further away from the stereogram than for conventional stereograms, thus permitting stereograms to be incorporated on a movie screen or billboard for simultaneous observation by many viewers.

Also disclosed is a method for superposition of two or more stereograms, and a stepping procedure whereby individual objects in a given row of a stereogram appear at different levels from the other objects in the same row.

BACKGROUND OF THE INVENTION

Conventional stereograms are pictures or illustrations which are formed on a page or screen in black and white, or in color. The underlying pattern of the stereogram, prior to creating raised or lowered images, is referred to as the base art or base stereogram. In a stereogram the base art consists of a series of adjoining, repeating bands. In the case of a random dot stereogram, the repeating bands are comprised of randomly generated picture elements (pixels). Each band has the same width (in the horizontal direction), and preferably the same height (in the vertical direction).

Upon examination by a viewer who fixes his focus on the stereogram in a prescribed manner, the stereogram appears to contain three-dimensional (3-D) images. That is, there is at least one three-dimensional image embedded in the stereogram, and certain portions of that embedded image appear to be raised or higher relative to the plane of the screen or paper. In addition or in the alternative, other images in other portions of the illustration may appear recessed or lowered. The term "image" when used herein means the 3-D impression in the stereogram.

In order to view the stereogram, the observer should focus on a point behind the stereogram and then move his eyes to focus on the stereogram itself. Or the observer should hold the stereogram close to his nose so that it appears blurry, then relax and stare and attempt to look "through" the stereogram. Then he should slowly move the stereogram away from his face until three-dimensional images appear.

A stereogram operates on the principle that, when looking straight ahead at an object, a person's left eye sees a slightly different view of the object than his right eye. A person's perception of depth is provided by these two slightly different views or perspectives of the same object. When the object is placed closer to the viewer, his eyes are forced to cross somewhat to focus on the object. His eyes interpret this crossing as meaning that the object is nearer or "raised". Thus, a stereogram gives the illusion of depth by providing two slightly offset images. When the left eye focuses on one such image and the right eye focuses on the other image, the result is an apparent difference in the relative depth of the two images. Alternatively, some viewers may cross their eyes in front of the stereogram to view the image.

Thus, a stereogram operates on the principle that the eyes can be fooled into perceiving an illusion of three-dimensions by creating one image on which the left eye focuses, and a slightly offset image on which the right eye focuses. The offset or shift in position between the two images, combined with an altered band width in the region of the shift, creates the illusion of 3-D.

Many people are familiar with stereoscopic art forms such as 3-D movies or stereoscopic viewers. Both of these forms require lenses to be placed over the eyes to achieve the desired depth perception. In the case of 3-D movies, a red lens and a green lens over the eyes permit one eye to view a red image on the screen while the other eye views a green image. The two colored images are positioned somewhat differently relative to the viewing background to give the illusion of depth.

There are also stereograms, however, which do not require any lenses or any other assistance to view them. Sometimes this type of stereogram is referred to a bare-eyed stereogram. The instant invention is concerned with bare-eyed stereograms.

A bare-eyed stereogram is created by arranging repeating vertical bands of artwork having a characteristic repetition width along a horizontal line. These repeating bands form the base art of the stereogram. The 3-D height effect or "rise" is created by shifting a portion of the base art to the left or the right. It is immaterial whether the direction of shift is toward the left along the horizontal line, or to the right. Horizontal here is defined as parallel to the line between the observer's eyes. However, consistency along the horizontal line and neighboring horizontal lines must be maintained in terms of further shifts. For example, a leftward shift to signify a raise in the height of the image, must be maintained. The choice of direction is, therefore, arbitrary and may merely depend on where the design is intended to have the greatest amount of distortion, because the level of distortion increases in the direction opposite to the direction of shift. For the instant invention, the convention that has been chosen is that a leftward shift corresponds to a rise in the height of the shifted image.

The material selected for raising or lowering can be a geometric shape, letter or any other desired shape. The shape of any such form can be approximated by a collection of small flat sections, provided that such sections are sufficiently small. As explained below, it is necessary to decrease (increase) the repetition width of the raised (lowered) portion by an amount equal to the amount of the shift. Although in this general discussion, the shift and the change in repeat width are treated as separate items, it is actually the change in repeat width that causes an appearance of a shift.

In effecting a rise in the level of a flat shape, the shape is shifted leftward so that a portion of the adjacent band to the left of the selected band will be covered by the shifted shape. It is actually the reduction in the repeat width of the shape that causes the appearance of a shift. At the rightmost edge of the shifted shape a dislocation or gap will appear in the original art from which the shape was shifted. In order to maintain the appearance of the stereogram, the dislocation must be filled. The dislocation should be filled with additional artwork which is different in design and color than the base stereogram pattern because the region of the dislocation is intended to be at a lower level than the "raised" portion so that the illusion is that one sees "behind" the raised shape. It is also necessary to resume the original repetition width of the base art (i.e., the original width of the band) to the right of the raised section, if it is desired that this region to the right be at the base level.

When the repetition width of the raised section is reduced, an observer viewing adjacent bands near that image will find that his eyes become somewhat more crossed and his eyes are thus fooled into believing that the narrower portion is closer or raised relative to the wider repetition width portions. Conversely, a rightward shift and increase in the repeat width involves a lowering of the shape. The final stereogram may contain a plurality of such raised or lowered portions within the same image.

Until now, known bare-eyed stereograms were of the type known as random dot stereograms. Random dot stereograms are stereograms formed from bands of randomly generated black and white (or colored) picture elements (pixels). A picture element is a contiguous region of a continuous tone artwork having a definite boundary. A pixel is the special case of a picture element which is square and is arranged in rows and columns and has an associated color. These pixels are small rectangular blocks or cells which can be represented on a computer screen and are manipulated by known electronic processing and imaging techniques. Pixel-based representations, regardless of the size of the pixel cells, are also known as raster-based representations if the stereogram is created, displayed or otherwise formed by such a representation.

Random dot stereograms are thus particularly well suited to computer image processing techniques. The pixels contained in random dot stereograms are relatively large and are visible to the eye. There are smaller pixels, called micropixels, which are well suited to the representation of continuous tone artwork. Such micropixels are typically a factor of ten or more smaller than the pixels used in random dot stereograms. The method contained herein involves associating each micropixel with a particular location along the x axis and the y axis of the screen or display, as well as associating each micropixel with a color level, for example an RGB color level, and with a value indicating the depth level at that pixel. In situations where stereograms are to be superimposed, transparency information must also be associated with each pixel.

Stereograms are useful as games and as means for encoding a message or graphical representation within a seemingly flat design. They can also be used as instructional aids in demonstrating how depth perception is detected by the eye. Some individuals can observe three-dimensional images in stereograms quickly, others may need much practice and still others may be unable to see the images.

Unlike the random dot stereograms, the methods and stereograms described herein are formed from repeating vertical strips of continuous tone artwork. It is convenient to represent such artwork in raster form at a micropixel level. However, the methods described do not depend upon the use of such raster-based artwork, and can be applied to vector-based and manual image processing techniques as well.

Further discussion of single image random dot stereograms is provided in a November 1991 article in *Omni* magazine by Scot Morris. The Omni article discusses the need to shift the dots to obtain the desired 3-D image. N. E. Thing Enterprises at One Kendall Square, Building 200, Cambridge, Mass. 02139, has also published stereograms and marketed software suitable for stereogram generation entitled Stare-EO Workshop, written and produced by Micro Synectic, Inc. This program creates random dot stereograms which contain various colors. Each color in the drawing (16 different colors are possible) represents a level of elevation of the stereogram image, either recessed into or out of the screen (or flat). In addition, Ultra Grafix Co. of Arlington, Tex., and NVision Grafix, Inc. of Dallas, Tex., and Front Line Art Publishing of San Diego, Calif. have marketed stereogram posters.

Random dot stereograms are constructed from base art consisting of repeated patterns of black and white random dots. The most obvious disadvantage of random dot stereograms is that the black and white dots are unattractive and unappealing to the eye and it would be much more aesthetically pleasing to produce a stereogram based on continuous tone (especially colored) artwork. The term color value used herein refers also to black and white stereograms. But there is another major disadvantage of random dot stereograms. The number of levels of the images embedded in the stereogram is limited because the width of the picture element cell is the smallest amount by which a shift can be made. Since the shifts produce depth, it is impossible to obtain a smoothly slowly varying curved surface with random dot stereograms which make use of relatively large pixels. Three dimensional objects that have continuous variation in depth can certainly be represented as random dot stereograms. However, the appearance of the image of the object is jagged and bumpy.

Three-dimensional images in continuous tone stereograms avoid this problem of jaggedness and, coupled with the beauty of full color artwork, they result in a major improvement to the black and white random dot stereogram.

An article by G. Slinker and R. Burton in the *Journal of Imaging Science and Technology*, Volume 36, No. 3, May/June 1992, shows that a random dot stereogram image can be generated by a series of patterned bands having a certain repetition rate (width). Each picture element in the image is associated with a depth level. By shifting a portion of the pattern a depth perception can be obtained. There is no disclosure of stereograms based on continuous tone artwork, nor is there any disclosure of a method to fill the gaps left by changing repeat widths.

Another discussion of random dot stereograms appears in a book entitled *Random Dot Stereograms*, published by Kinsman Physics, 1992, by Andrew A. Kinsman. Once again there is no disclosure of stereograms based upon continuous tone artwork nor is there disclosure of any technique of filling the gaps by other than randomly generated pixels.

Thus, the prior art random dot stereograms contain certain fundamental features: (1) producing a strip of base art consisting of random black and white or colored cells arranged in a rectangular shape and then repeating this rectangular shape at regular horizontal intervals side by side to create the repetitive base art; (2) creating depth information for each pixel of the base art. If the depth information is inputted by means of an equation, creating depth information is extremely simple, but if the depth information is inputted using other techniques then such programs would require some form of inputting technique or user interface; (3) interpreting the depth information to arrive at a new color or black/white value for each pixel in the base art.

The most convenient way to perform this process is to process each horizontal line separately and to determine for each pixel on the line which color value it should have. Such a determination depends on the color values of the pixels to the right (or to the left) and also on the amount of depth assigned to that particular pixel. Starting at some point on the horizontal line and moving in a given direction (for example, starting on the left and moving to the right) the depth will vary up or down as compared with the previous pixel. If the variation of depth is upward (i.e., a raise) for a given pixel as compared with the previous pixel, then the determination of the color value for that new pixel can simply be made by computing a new repeat width for that particular pixel which is given by the original repeat width of the base art minus an additional amount proportional to the amount of change in depth at that particular pixel. This new repeat width is maintained with regard to the next pixel unless there is a subsequent change in depth on that pixel as well. For example, if a flat area is raised and the pixels are processed from the left, a new repeat width is calculated for the first pixel in the raised area and then that repeat width is assigned to all subsequent pixels to the right unless they change in depth. In other words, it is the change in depth that determines the amount of the repeat width.

For example, for a surface having a depth characteristic that rises continuously from left to right, the repeat width would continuously decrease as one moves from pixel to pixel from the left to the right. However, for changes in levels that represent a lowering (recession) from the previous pixel, additional factors must be considered. First of all, for every recessive displacement or lowering, a "gap" is created which must be filled with additional artwork, i.e., with a new pattern of pixels different from the colored patterns of the pixels in the base art. In the case of random dot stereograms supplying additional artwork can easily be accomplished by randomly generating the color values for these pixels appearing in the "gap", just as the original base art strip was created by randomly assigning black and white values to each pixel.

In addition to the gap that appears when there is a recession, there is also an increase in the repeat width which is proportional to the amount of recessive displacement in depth from a given pixel to next pixel. This increase in repeat width for recessive displacements does not have any effect across the width of the gap but after the gap is generated, the new value for the repeat width takes effect at subsequent pixels appearing at the edge of the gap and beyond.

In order to produce a smoother variation of depth than heretofore attainable in random dot stereograms, it is not possible to simply decrease the size of the dots in random dot stereograms because, beyond a certain minimum size, the eye has difficulty distinguishing individual dots and the dots will blur into one continuous gray or other color tone. If your eye cannot distinguish individual dots, then the ability of the stereogram to encode depth fails since the eye will not be able to see changes in repeat widths on the final art.

The actual limit on the size of the dot for random dot stereograms depends to some extent on a given person's eyesight. However, as the dots get smaller than a thirtieth of an inch, the eye has trouble seeing the effects of the stereogram. In other words, the larger the dot, the easier it is for your eye to see the stereogram but the "bumpier" the 3-D image appears. As the dots get smaller and smaller, your eye has much more difficulty seeing a stereogram even though the smoothness of the stereogram improves.

In another aspect of bare-eyed stereograms, the method of creating a stereogram by spacing objects evenly in rows whereby one row has equal spacing between objects and the next row has different spacing between objects has been known. For example, N. E. Thing Enterprises makes some postcards which show this. The stepping procedure of the invention is an improvement whereby the objects in a given row appear at different levels from other objects in the same row. Also, a combination of superimposition of multiple stereograms and stepping creates an improved stereogram.

Continuous tone stereograms are a major improvement over random dot stereograms because they are more attractive than the random dot stereograms and they also provide for a more continuous variation of depth.

Stereograms which are available currently are designed for viewing from a relatively close distance, i.e., up to about 1–6 feet away. However, stereograms that are viewed at this distance are limited to viewing by a few observers at a time. Such stereograms would be unavailable for use in mass advertising such as billboards, or in a movie theater in a moving picture illustration.

Also, it has not been known to superimpose stereograms having transparency information, nor has a stepping procedure for producing stereograms been known.

In summary, no method is known to produce continuous tone art based stereograms which have satisfactory method to fill gaps or dislocations that result when portions of the artwork are shifted. Also, known stereograms are ill-suited to viewing on a large screen or by a mass audience.

OBJECTS OF THE INVENTION

One object of the present invention is to provide a process for creating stereograms from continuous artwork. Another object of the invention is to provide an improved process for filling the dislocations which result from shifted segments in a stereogram illustration in order to produce a more effective 3-D image having an acceptable appearance relative to the base artwork, and to provide a stereogram made according to that method.

Another object of the invention is to provide a computer implemented process for creating stereograms, which process is readily adaptable to electronic reproduction and image processing techniques.

A further object of the present invention is to provide a stereogram which can be viewed from a greater distance and by a larger group of people than possible previously, and a process for making such a stereogram.

A further object of the invention is to provide superimposition of multiple stereograms.

A further object is to provide a stepping procedure to create depth effects in stereograms.

Additional objects, advantages and novel features of the invention will be set forth in part in the description which follows and will become apparent to those skilled in the art to which the invention relates upon examination of the following or upon practicing the invention.

SUMMARY OF THE INVENTION

The foregoing and other objects of this invention are accomplished by providing a computer implemented process for making a stereogram in raster form by providing a computer system having a central processing unit, memory means, storage means, user interface means, a raster-based edit program and display means. The process further comprises inputting a band of continuous tone artwork of picture elements, forming a stereogram base of adjacent bands, and assigning depth information to the picture elements in the base. The process also involves selecting first, second and/or external picture elements and associating them with assigned information. First picture elements are assigned new information from second or external picture elements and the central processing unit calculates the new information.

In accordance with another aspect of the invention, there is provided the above-described process of making a stereogram where the information assigned to picture elements comprises color information.

In accordance with another aspect of the invention, for information values below a threshold the new color information is obtained by adopting the color values of adjacent picture elements.

In accordance with another aspect of the invention, for information values greater than or equal to the threshold, the external elements form a replacement strip segment having a boundary. The color values of the picture elements of the replacement strip segments are color averaged at the boundary.

In another aspect of the invention there is provided a stereogram which has bands of artwork having a band width that exceeds four inches.

In accordance with another aspect of the invention, there is provided a system for viewing a stereogram with bands whose width exceeds four inches where a target is placed in front of the stereogram to aid the observer.

In accordance with further embodiments, there is provided a stereogram formed by the processes described above.

Still other objects and advantages will become readily apparent to those skilled in this art from the following detailed description, wherein is shown and described only the preferred embodiment of the invention by way of illustration of the best mode contemplated for carrying out the invention.

As will be realized, this invention is capable of other and different embodiments without departing from the scope of the invention. Accordingly, the drawings and description which follow are to be regarded as illustrative in nature.

BRIEF DESCRIPTION OF THE DRAWINGS

FIG. 1(b) is the same illustration as FIG. 1 but with the cell numbers displayed;

FIG. 4 is a block diagram of the inputs to FIG. 6;

FIGS. 8(a)–(d) are graphical representations describing a far stereogram;

DETAILED DESCRIPTION OF THE PREFERRED EMBODIMENTS

Figures 1, 1A:
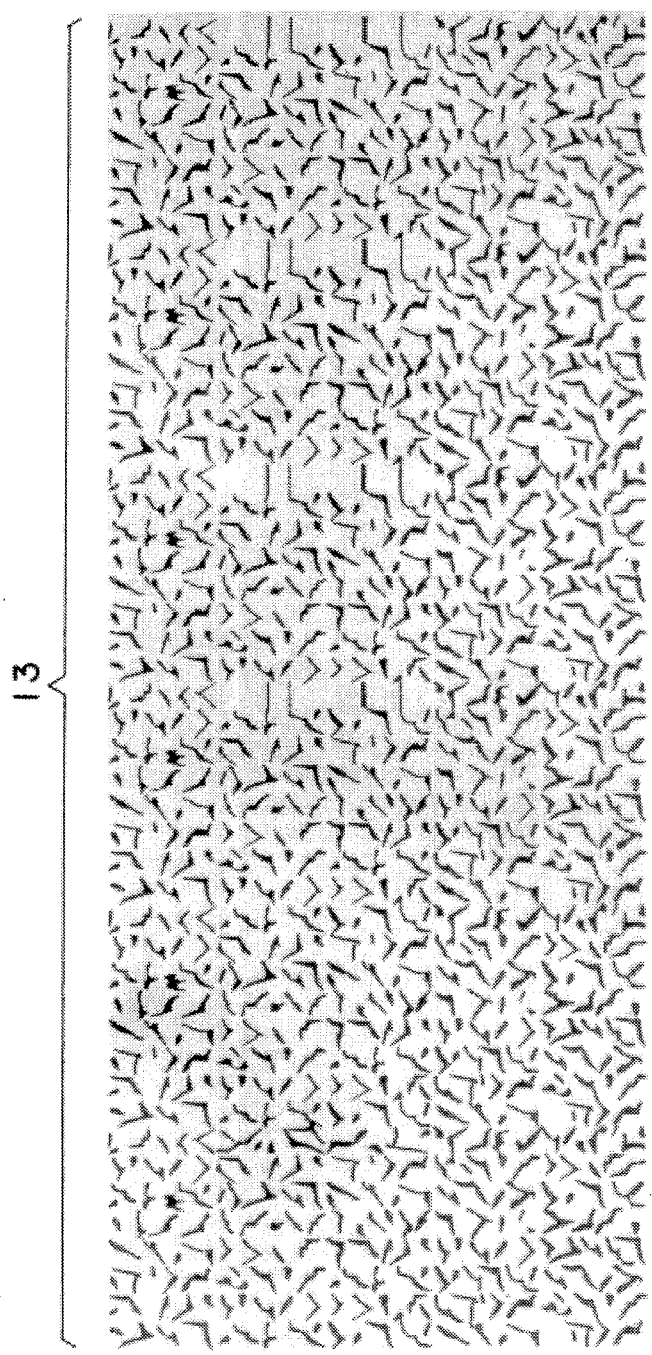
FIG. 1 is an illustration of a stereogram containing original art bird figures where the dislocations have been filled in by the smear technique.
FIG. 1(a) is a representative repetitive band from which FIG. 1 was constructed.

As discussed above, a straightforward application of a procedure developed for random dot stereograms to continuous tone stereograms does not work. Therefore, additional techniques have been developed to produce continuous tone stereograms.

The present invention relates to a computer implemented process for making a stereogram which process includes providing a computer system. The computer system may be for example an IBM compatible PC which has a 486 CPU running at 33 Megahertz (or more) (with 8 megabytes of RAM). The stereogram is in raster form meaning that its picture elements are pixel form. Pixels are small repeating rectangular units usually arranged in adjacent rows and columns across a screen or page and which have certain information associated with them. A group of pixels together make up a complete picture or illustration. For example, a full stereogram might be 4000 pixels high×4000 pixels wide.

The computer system has at least a central processing unit, memory means such as hard disk drive memory or other optical or magnetic media and storage means for storing data. The data can be stored in memory. The computer system further contains user interface means whereby a user gives instructions to the central processing unit and inputs data to the storage means. For example, the user interface means could be a keyboard, a mouse or a scanner such as an HP II C scanner for scanning in and digitizing into 24 bit RGB color format photographs or other art.

The computer system also contains a raster based edit program such as Adobe Photoshop, or Adobe Illustrator which are drawing programs that enable manipulation, e.g., copying, pasting, or moving artwork in standard picture element format.

The computer system also has display means such as a screen or a printer to display the created stereogram.

The computer-implemented process of the invention consists of inputting into the computer system a band of continuous tone artwork. Continuous tone artwork is any color or black and white artwork that is not in random dot form. For example, a drawing, photograph or painting. The artwork is in the form of pixels; microscopic sized elements give particularly good results. The means of inputting the artwork are several. It can be scanned from an existing picture or photograph on, e.g., an HP II C scanner which digitizes the artwork into 24 bit RGB color format. Alternatively the artwork can be created on the computer by any number of pixel-based or vector based drawing programs such as Corel Draw, Adobe Illustrator or Adobe Photoshop and then converted to picture element format if not created in that form. Each picture element of the input artwork is then associated with certain information such as depth, color or transparency. The bands preferably have a particular pattern, design or configuration.

In continuous tone stereograms the pixels are of a microscopic size and it is not the individual black and white or color values of a given individual pixel that represent the pattern which your eye sees, but rather a larger scale picture or drawing which is represented by those pixels. The primary problem in applying the techniques of black and white stereograms to continuous tone stereograms is with regard to the filling of the gap created by negative recessions. Random black and white or colored pixels cannot be used because they are too small to be seen by the eye and will appear blurred together into one continuous tone. In order to fill the gap created by negative recessions a new pattern of artwork is needed.

In the procedure that has been developed, there are two fundamentally different methods of creating a new pattern for this artwork to fill the gap. Method number one is to use pixels on the same horizontal line from the extra art strip as discussed above. This extra strip can be made by horizontally flipping the original art strip or by creating new art. We refer to this method as the "method of spliced commissure." Method number two is to stretch a neighboring pixel, that is, repeat the previous pixel color before the gap began and continue repeating this pixel color until the gap ends. This method will result in the appearance of "stretch marks" in the final artwork. We refer to this method as the "method of smear."

In order to effectively carry out a procedure for the processing of continuous tone artwork, it was found that it is necessary to combine both of the above methods. This can be explained as follows: If only method number two was used, it would look aesthetically pleasing for small gaps. However, for larger gaps the stretch marks would appear quite unattractive. Aside from unattractiveness, the stretch marks inhibit the encoding of additional depth information in the subsequent pixels that are processed to the right (or left if that is the direction in which the processing is initiated). This is because every disturbance or change in the pattern of coloration must be repeated at regular intervals in the direction in which the processing is occurring in order for the stereogram to work.

A horizontal line containing segments of constant color does not allow representation of depth information. Therefore, a simple smearing of a pixel to fill a gap would work adequately for a flat raised section (although it would produce unattractive stretch marks). However, if the depth of image contained multiple raised and lowered areas, the stretch method would not work well and would inhibit the ability to show proper depth besides being unattractive because of the stretch marks. However, method number one cannot be used by itself because of the following reason: It works well for large gaps in which a section of pixels are cut out and pasted in to fill the gap, however, for very small gaps (particularly those gaps that are created by surfaces that slowly vary in depth) the appearance of the gaps is extremely unattractive if only method one is used. This is because lines appear in the image which interfere with the viewer's ability to appreciate the original continuous tone artwork. These lines also can interfere with the viewer's ability to appreciate the depth information in the artwork and can add to a feeling of jaggedness in the depth object. The unattractive lines that appear when method number one is used and the unattractive stretch marks that appear when method number two is used can be both eliminated if the two methods are combined in such a way that for small gaps method number two is used and for larger gaps above a certain threshold, method number one is used.

It was found that a good threshold for switching between the two methods is for gaps in the neighborhood of approximately 0.06 inches. This produces a final piece of art that not only looks aesthetically pleasing but enables it to encode the depth object properly and generally avoids a jagged appearance.

It is theoretically possible to employ a manual cut-and-paste technique to the methods described herein. However, such a process is awkward, time-consuming and unlikely to produce consistent results. It is impractical to employ such a method where intricate designs and/or multiple raised or recessive levels and/or continuously varying levels in a stereogram are desired.

As a practical matter, however, it is difficult to manually move, i.e., cut and paste shapes. Any manually applied technique requires great accuracy, therefore computer assisted semi-manual cut and paste techniques are preferred. The base art can be manipulated by computer cut and paste techniques if it is first scanned in a standard pixel format (colored or black-and-white) and then manipulated using standard drawing programs such as Adobe Illustrator (a pixel or raster based drawing program). Alternatively, the artwork can be created on the computer in vector format or converted to vector format and manipulated by a standard vector based drawing program such as Corel Draw. Vector-based artwork is artwork that is generated by equations and, therefore, theoretically has infinite resolution. Corel Draw is a semi-manual vector-based drawing program which utilizes standard "cut", "paste" and "move" commands to edit drawings.

In order to create the illusion of a three-dimensional image, it is useful to first consider a single small flat shape and then generalize to a more complex image. The shape to be raised or lowered is cut out of one of the bands and is then shifted a certain distance (left or right) along the horizontal line, and the resulting gap is filled in. The repetition width within the shifted region is varied from the characteristic width by the amount of the shift distance (decreased for a shift left, and increased for a shift right). And the change in the characteristic width results in the appearance of a shift.

For example, as you move from the leftmost band toward the right in the stereogram design, a square shape whose width exceeds a band width might be removed from the second or third band, and shifted to the left. Such a shift would be accompanied by a decrease in the band width in the shifted portion and appears to the observer to be higher than the base or background design, i.e., it is raised relative to the page. At the rightmost edge of the raised square there will be a gap or dislocation in the original art resulting from the shift.

One aspect of the invention is shown in FIGS. 1 and 1(a). The stereogram shown in FIG. 1 is based upon vector-based artwork consisting of stylized figures of birds in flight. FIGS. 1 and 1(a) illustrate the method of the invention applied to discrete blocks or portions of the illustration. While the method can be applied either to vector-based or manually created or continuous representations of artwork, it is often more efficient to utilize pixel (raster) based representations such as described further below. However, the vector-based cut and paste (i.e., semi-manual) application gives a useful illustration of the claimed method. FIG. 1(a) shows a one-inch wide repeating band 11 of artwork which forms the repetitive bands 11 of the stereogram base artwork 13 seen in FIG. 1. The repetitive bands 11 are adjacent to one another and extend from left to right in FIG. 1. The illustrations depicted in FIGS. 1 and 1(a) and 1(b) have been created through the use of Corel Draw software, a vector-based drawing program.

Referring now to FIG. 1(b), the design of FIG. 1 is repeated but with cells 15 imposed on the artwork 13'. The cells have been arbitrarily chosen to be one-eighth of the width of the repeating band 11 and the cells 15 are numbered 1–8 in the repeating band 11'. The cells 15 are repeated in the artwork 13'. The repeating bands 11' are composed here of five rows 17 with each cell numbered from 1–8 within each row. In this embodiment, each of the cells numbered 1–8 has a length of 0.5 inches and width of 0.125 inches. It can be seen that a rectangle 17 which measures 8 cells wide and two rows high has been excised or "cut out" of the second and third rows 8 of the third band and shifted to the left. The cut out rectangle 17 has a reduced band width, namely only a seven cell width rather than an eight cell width. This can be seen by the presence of cell numbers 2–7 between cell nos. 1 located at either edge of rectangle 17. The eye perceives the band width as the width between repeated cell no. 1 at either side of cell nos. 1. The second and third rows 18 from the top in the third band are, therefore, shifted to the left by one cell width so that cell number 8 of the second band has been replaced by cell number 1 of the third band at 21. A leftward shift, according to our convention, appears as a raised image.

Each of the other cell numbers 2–7 in the second and third rows from the top of the third band is similarly shifted left one cell width. Therefore, as one moves down the rows in the third band, cell number 1 in the first row is directly above cell number 2 in the second and third rows and cell number 1 in the fourth and fifth rows.

It can be seen that the band width in the shifted rectangle 19 has been reduced by the amount of the shift, i.e., one cell width, because there are six cells (cell nos. 2–7) between the first repeat, i.e., between the first appearance of cell no. 1 and the second appearance of cell no. 1. Therefore, only cell unit numbers 1–7, rather than 1–8, remain in the shifted position 19. Moreover, the shift resulted in the shifted rectangle 19 overlapping cell no. 8 from the cell immediately to the left of the shifted rectangle 19.

The rectangle 19 which is shown shifted to the left in FIG. 1(b) gives the appearance of being raised because the left shift, in combination with a reduced repeat width for the shifted rectangle 19, gives the appearance of a raised rectangle image in the figure.

It can be seen that the leftward shifts of the rectangle 19 have caused dislocations 27 to the right of each cell number 1 that appears on the right edge of rectangle 19. These dislocations 27 consist of gaps in the artwork caused by the shift. The width of these dislocations 27 correspond to the amount of the shift, i.e., one cell width. The dislocations represent a return to the characteristic band width to the right of the shifted rectangle 19 so that the eyes perceive no other unintended depth effects. They in effect add width on to the reduced band width (to the right of the shifted section) in order to resume the original band width in that area. This dislocation pattern is repeated to the right in the fourth, fifth, and sixth bands, respectively.

In FIGS. 1 and 1(b) the dislocations 27 are shown filled by the smear technique whereby each point 29 on the right edge of cell number 1 is stretched or repeated horizontally across the dislocation until it meets the left edge of cell number 2. This smear technique is applied to each point at the left edge of the dislocation 27, and is repeated for each of the dislocations 27 which are present. It can be seen that this smear technique results in rather unattractive stretch marks 31.

It should be noted that even though FIGS. 1, 1(a) and 1(b) have been shown in black and white they can be extended to other colors by adding color to the bird figures and to the background within each numbered cell. If such color is added, the color of each of the stretch marks 31 would be the same as the color of the corresponding point on the right edge of cell number 1. For the artwork represented in FIGS. 1 and 1(b), the minimum shift needed to obtain a raised level is the cell width. In this case it is one-eighth of an inch; in the case of random dot stereograms, it is the random cell width. In the case of pixel representations of continuous tone artwork, it is one pixel. It has been found that it is difficult for a pair of eyes to focus on two nearby areas to see a depth contrast if the contrast (represented by width) is too great. (If it is greater than half the original repeat width, it becomes very difficult to focus for most people). It has been determined that the maximum shift which could still show the 3-D effect is approximately the original repeat width W, and that a shift greater than the repeat width would not properly show the 3-D effect. This is because a shift of the original repeat width plus some incremental amount greater than 0 (called E) is indistinguishable from a shift by the amount E. W+E is ambiguous with a shift of E. It is, therefore, impossible for the eye (or any other measuring device) to distinguish between these two different ambiguous shifts and thus shifts greater than W give ambiguous results.

It should be noted that the above method, which shifts objects to the left to reflect a "raised" image, can be reversed simply by inverting the stereogram, i.e., turning it upside down, in which case a shift to the right reflects a "raised image".

Figure 2:
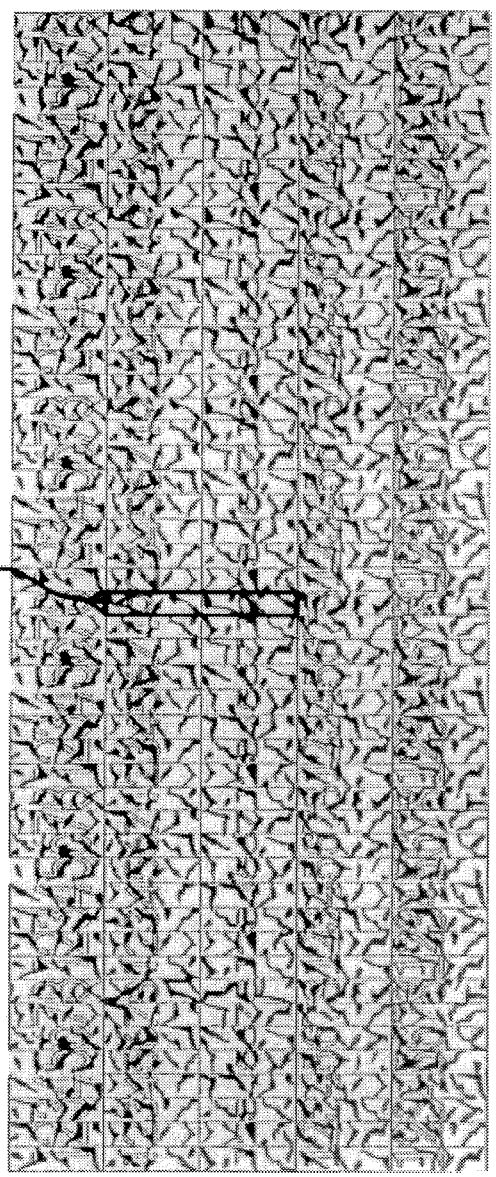
FIG. 2 is an illustration of a stereogram with cell numbers displayed containing bird figures where the method of spliced commissure has been applied to the original art.
Figure 2A:
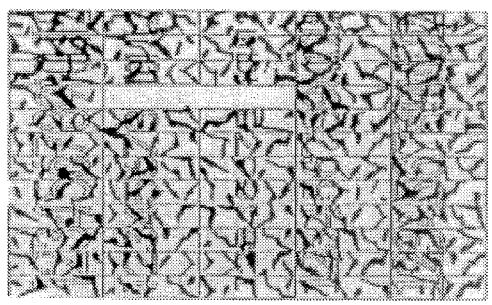
FIG. 2(a) is the parent strip from which the replacement strip has been taken.

Another embodiment of this invention is depicted in FIGS. 2 and 2(a). The band of vector-based continuous tone art shown in FIG. 2(a) is a "parent" strip which is wider than the actual band repetition width shown in FIG. 2. The excess width (numbered cells 9–12) in the forms a remainder strip 33 which is utilized to fill in the dislocation 35 in the stereogram depicted in FIG. 2. Only the band 31 is utilized to form the base art. For example, the second and third rows of cell number 9 in remainder strip 33 may be placed in the dislocation 35. Apart from being spliced in to fill dislocations 35, the remainder strip 33 of parent band is not used in the resultant artwork. Any portion of the remainder strip 33 can be utilized to fill in the dislocation 35. However, a different portion of the remainder strip 33 should be selected for each dislocation 35. Alternatively, portions of the remainder strip 33 used to fill the dislocation 35 should be selected from portions of the base art that are located sufficiently far away from the dislocation 35 to fill the dislocation 35. Alternatively, the remainder strip 33 consists of a mirror or flipped image of the adjacent repeating band 31.

The choice of a rectangular shifted shape is arbitrary and this method could incorporate other shapes. For an irregular shaped cut-out, the raised image is obtained by greatly reducing cell size and then representing the shape as having a large number of very small cells. Thus, virtually any shape can be represented by a large number of small cells. The above demonstrates the method of producing stereograms without using pixels. It also serves as an important graphic demonstration of similar techniques that are used below.

The concepts demonstrated above can be extended to electronic reproduction techniques where continuous tone artwork can be represented in the form of a series of small picture elements (called pixels) which are of a characteristic size. The process described below can be implemented on an IBM compatible personal computer with a 486 chip and 33 or 66 megahertz speed. The operating system is Microsoft DOS 5.0. Hard drives used with this system have one gigabyte of storage. The programs mentioned above, Adobe Photoshop and Corel Draw operate on Windows, version 3.1. The computer programs written for implementing the processes of the invention can be written in Power Basic.

Artwork is electronically scanned and converted by well-known techniques to a digital representation by pixels. To effect the conversion, an input repeating band of full color art is scanned into a computer graphics file by a standard graphics editor.

An RGB 24 bit color format can be used to depict the color of the artwork, where RGB represents the red, green and blue color level at each pixel to represent full color artwork. The preferred software utilized in conjunction with such a scanner is, for example, Adobe Photoshop distributed by Adobe Systems, Inc., 1585 Charleston Road, P.O. Box 7900, Mountain View, Calif. 94039.

Designs for the bands and base art can also be created with drawing type programs. These programs are vector-based drawing programs such as Corel Draw or pixel-based drawing programs, such as Adobe Photoshop. These programs can be utilized to create artwork. If the drawing is not in rasterized form it has to be exported into rasterized form. The rasterized form chosen for this process is RGB 24 bit color format.

Figure 3:
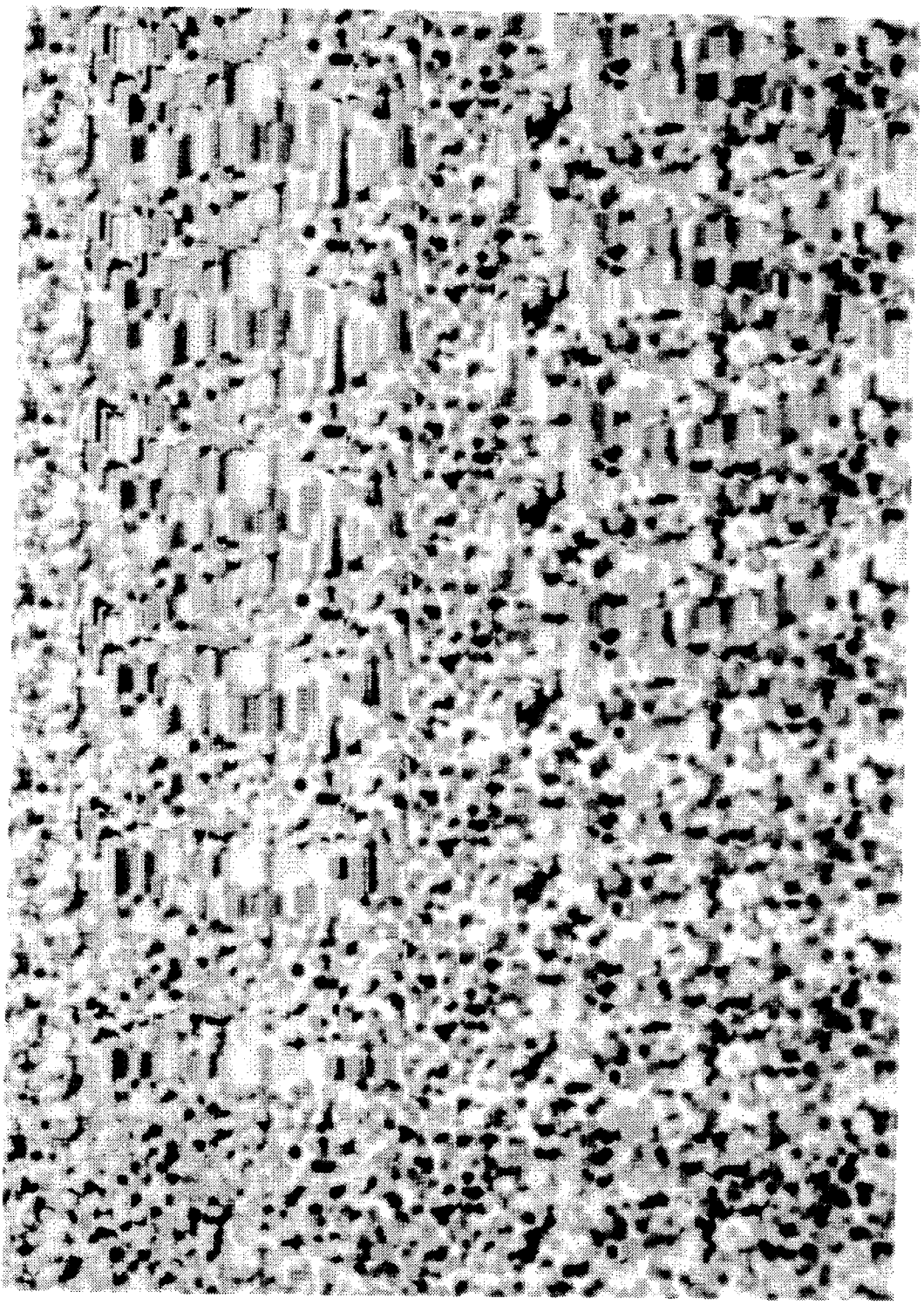
FIG. 3 is an illustration of the invention showing the dislocations filled by the smear technique.

In RGB format, color representations are made by associating each pixel with a particular intensity level of red, blue and green ("RGB") which varies from 0 to 255. An example of a stereogram consisting of artwork converted to colored pixels is shown in FIG. 3. The smear technique has been applied to the stereogram shown in FIG. 3.

To avoid the appearance of seams between adjoining repeating bands in the base art, it is useful to match the color of each pixel at X=0 to the color of each corresponding pixel at X=IXR1−1 (where IXR1 is the initial repeat or band width) for every y. This can be done in a known manner using the graphics editors. However even if such a match of colors is not performed, that has no effect on the fundamental process.

As best seen in FIG. 4, the inputs to FIG. 6 described below are the base art for the stereogram and the level at each pixel. The following definitions apply and will be explained more fully below:

IXD is the width of final art in pixels (integer).

IXR1 is the initial repeat width (integer).

PARAMXR2 is the width of the parent strip (integer).

PARAMA1 is the threshold parameter for application of smear method as a fraction of repeat width (floating point number).

IY is the height (H) of art in pixels (integer).

IFN( ) is the RGB color of base art (24 bit).

IDFN( ) is the RGB color of the parent strip (24 bit).

IFCN( ) is the level at each pixel level (integer).

XR is the current value of the repeat width as a function of x, an integer. Although it is an internal variable, its interpretation is useful because it can be used as a measure of depth and compared with the spacing defined in the stepping procedure discussed below.

As shown in block 37 of FIG. 4, the section of IFCN from x=0 to x=XR1−1 is the art strip that is repeated to create the base art. The section from x=IXR1 to x=PARAMXR2 is the extra strip (or replacement strip) used to insert in gaps caused by negative level changes (both sections are included in one array only for computational convenience). This method of filling gaps is employed in the method of spliced commissure. The replacement strip is then the source of additional art ("extra art") external to the base art. It was discovered that the repeat strip should not simply be duplicated to become the extra strip because ghost images, i.e, the impression of additional images which do not belong there will often result in situations where there are numerous large negative depth changes. However, the art strip from x=o to x=IXR1−1 can be duplicated, i.e., flipped over a vertical line in a mirror image and used as the replacement strip. In this case PARAMXR2=2*IXR1.

Whether additional art external to the base art ("extra art") is created or whether the art strip is flipped as above, it is sometimes useful to edit the extra art after initial run if the color in the spliced art is not visually appealing. It was found to be more aesthetically pleasing to try to "match up" the color on the left (x equals zero) and right (x equals XR1 minus one) sides of the art strip. Such matching, which preferably can be done by an artist, can be accomplished by cutting and pasting in a program such as Adobe Photoshop. It should be noted that such matching is completely optional and has no effect on the procedure itself.

It should be noted that the base art has a width that is wider than the output art. As seen in block 41, to create base art, this width was chosen for computational convenience. It should also be noted that by this procedure the left side of the output art from x equals zero to x equals IXR1 minus one is left unchanged from the base art and it can be cropped off at the end of the procedure to produce final art.

The level (raised or recessive) at each pixel can be computed from input "grey scale" information, as seen in block 39. Inputting such information does not involve the use of color, instead it involves the use of black, white and grey tones. Each grey tone from zero (white) to 100% (black) represents a different level.

Unlike embossing or light shading which various programs (Adobe Photoshop, Corel Draw) used to simulate a 3-D object, the black and white shading in the grey scale method actually codes for depth—it does not merely simulate the appearance of depth. The program associated with this method can then recognize the depth level at each pixel. This format facilitates editing and transformation of depth levels and it can be applied to any digitized three-dimensional illustration. The depth coding technique involves assigning a grey scale level value from 0 to 255 for the depth at each pixel. The grey scale value, Z, is chosen to be defined with the maximum raised level as 255, the base art level as 128 and the maximum recessed level as 0.

If more than 128 raised levels are desired, and if no recessed levels are needed, the base art level can be defined as 0 and the maximum raised level as 255. Similarly if more than 255 total levels are desired, an RGB illustration can be made in which 256 values of G represent raised levels and 256 values of R represent recessed levels, resulting in a total of 512 levels. Further combinations can be obtained using B.

A parameter S representing the maximum depth displacement of the illustration as a fraction of the repeat width must be determined. The value of parameter S depends on the nature of the embedded image and, in particular, on the amount of separation between two images having different depths. Typically, the values for S should range between 0.1 to 0.4; S must be greater than 0 and less than 1. As the value of S increases, the eye has trouble focusing if the depth shift is too great. The common range for repeat width is typically 0.9" to 1.6". For much less than 1.0" repeat width, observers have a tendency to see a broken image or skip portions of the image.

Once S has been determined, [the maximum number of levels=maxlevel=integer [2*S*IXR1] is calculated as shown in block 43, where IXR1 is the base repeat width. If maxlevel is greater than 255 then it is set equal to 255. Also, if maxlevel is an odd integer then it is reduced by 1. The level at each pixel is determined as in block 45.

For complicated three-dimensional objects, representation of continuous depth levels ordinarily requires that a three-dimensional model be built and then scanned into the computer for editing. The scanning is accomplished, for example, by using a Cyberware 3-D digitizer.

EXAMPLE 1

Figure 7A:
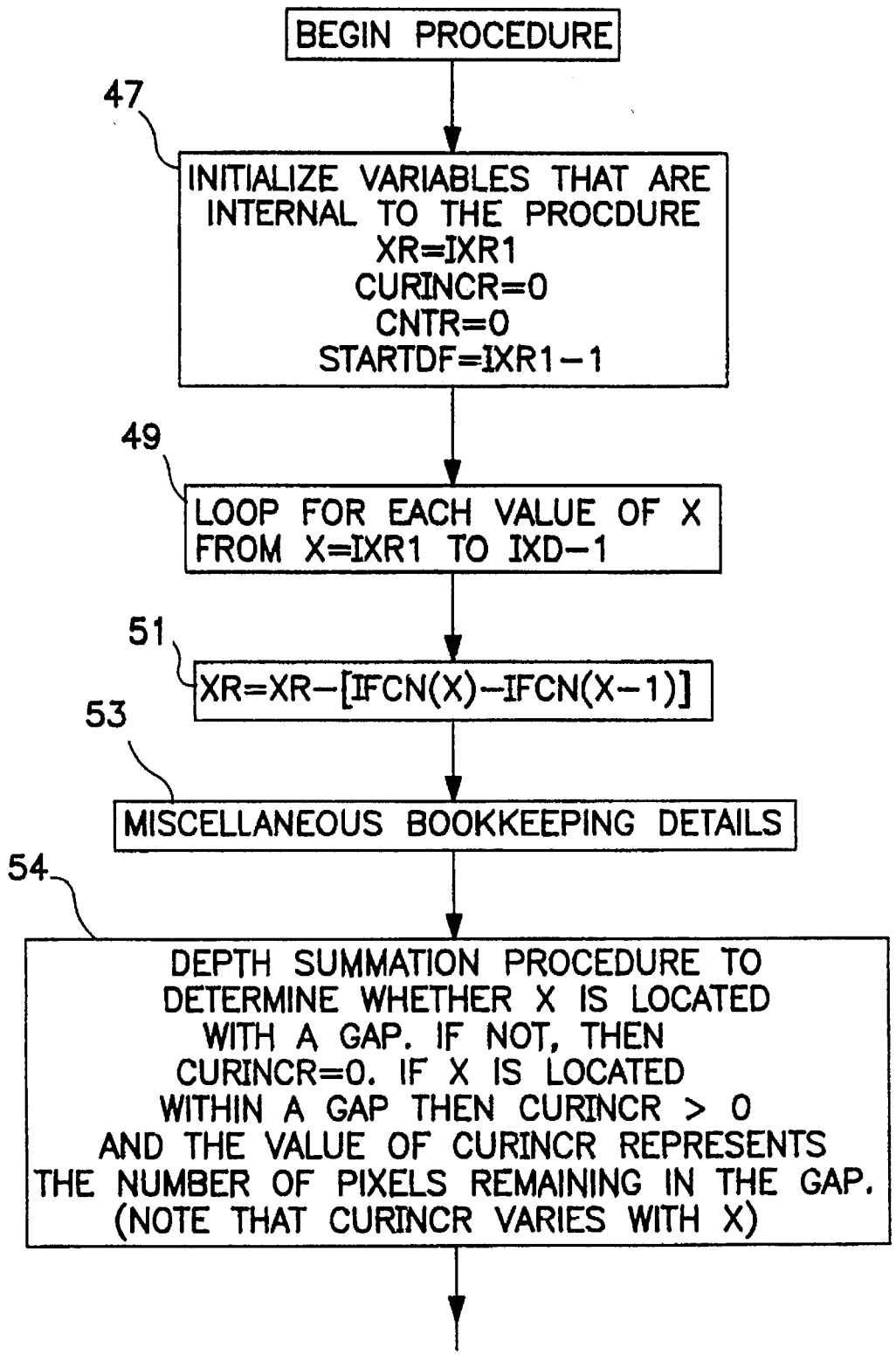
FIG. 7 is a flow chart describing programming for carrying out the invention as shown in FIG. 6 but with certain bookkeeping details omitted.
Figure 7B:
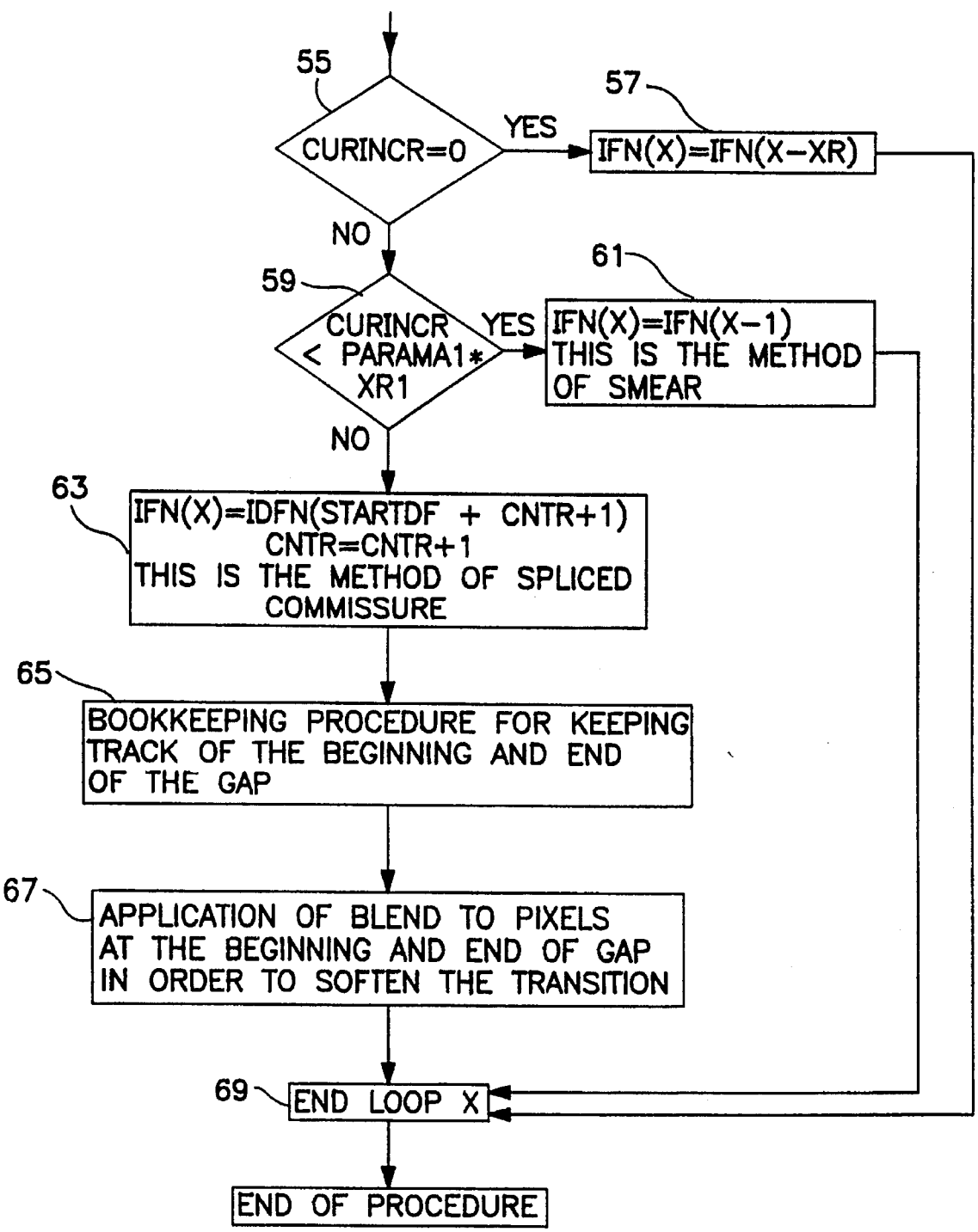

FIG. 7 shows a flow chart of a procedure of the invention omitting certain details involved in the "bookkeeping" of the location and width of the gaps (block 65) which are caused by negative level changes. In addition, the flow chart in FIG. 7 does not show details involved in the blending (color averaging) at the edges of the gaps and at the boundary of the spliced section of replacement strip art. The procedure will first be explained without such details. FIG. 6, which is a more complete flow chart showing all details of the claimed invention, will follow.

All the variables that are external to the procedure have been defined above. Each picture element has an x and y location in a rectangular base. Note that the "input" variable IFN( ), which represents the RGB color of each pixel in the base art is "overprinted" with new values and becomes the "output" variable containing the final art (block 61). This is done for computational convenience. Although variables are shown as a function of (x) only, they exist for each value of y as well and could have been written explicitly as a function of (x,y).

There are a number of internal variables that are not inputted or outputted from the procedure and, therefore, are not necessary to an understanding of the overall procedure. However, an intuitive description of the internal variables in FIG. 7 is useful for a full understanding of the procedure. Referring now to block no. 47 of FIG. 7:

XR is the current value of the repeat width as a function of x, an integer.

CURINCR is the current value of the number of picture elements remaining in the gap as a function of x, an integer.

STARTDF and CNTR are the starting point and counter, respectively, used in keeping track of picture elements in the extra art. Both are integers. The purpose of keeping track of these picture elements is to avoid splicing in the same group of picture elements in each of the gaps when the method of spliced commissure is implemented to fill gaps. (As described below, there is an alternative variation in the procedure that does not used these two internal variables.)

The initialization of these variables are carried out for each value of y.

Referring now to block no. 49 of FIG. 7, the region from x=0 to x=IXR1−1 is omitted from the processing loop because these pixels are left unchanged in the final stereogram. As discussed above, this region exists only for processing convenience and is cropped off at the end. The loop is processed for each value of x from IXR1 to IXD-1, i.e., until the width of the output art.

Block no. 51 shows a formula in which the repeat width, XR, is a function of x and depends upon the repeat width at the previous x and upon the change in depth from the previous x.

Block no. 53 contains certain detailed bookkeeping steps shown in full detail in FIG. 6 below.

Block no. 54 shows the depth summation procedure to determine whether x is in the gap. As seen in blocks 55 and 59, if CURINCR=0, it means that x does not lie within a gap and a simple repeat width based formula can be used to determine the RGB color value IFN(x).

In the special case where the depth varies slowly with x, i.e., |IFCN(x)−IFCN(x−1)|≦1, block 54 reduces to the simple steps:
[IFCN(x)−IFCN(x−1)]=−1
if yes, then CURINCR=1
if no, then CURINCR=0

A more detailed procedure is needed in the case where depth varies more quickly in order to keep track of the width of the gap. In the general case it is also necessary to keep track of variations in depth within the gap and to incorporate these variations into a depth summation procedure. This is because such variations actually change the width of the gap.

However, if CURICR<PARAMA1*IXR1, another formula applies (blocks 59–61). This is a threshold test for determining whether a picture element in a gap should be filled by the method of smear or the method of spliced commissure.

The method of smear involves adopting the color value of picture elements at the edge of the gap, as described above. It applies if the value of CURIINCR is below the threshold. The smear method is effective for smaller gaps widths under approximately 0.06". For large gaps widths the smear method results in unsightly stretch marks. On the other hand, the method of spliced commissure is effective for large gaps but produces unsightly "lines" in the final art for smaller gaps. It was found that by fixing PARAMA1 at a value of about 0.05 or 0.04 for repeat widths (XR1) of 1.2" results in excellent appearance of the output art.

As shown in block 61, described above, the "method of smear" is utilized for gaps below the threshold value. However, if the value of CURINCR is above the threshold, as seen in block 63, the method of spliced commissure or its equivalent applies. A special counter (CNTR) is used to ensure the different pixels in the replacement strip are chosen successively so that the same successive picture elements are not chosen for each gap which may occur along the same line. After each use of a particular pixel the counter, CNTR, is incremented by one. An alternative method is to use the following formula in block 63: IFN(x)=ID-FN(IXR1+x mod (PARAMXR2−IXR1)) where the function a mod (b) is defined as returning the remainder after the whole number division of a by b.

This alternative method may, depending on the nature of the artwork used, give a more pleasing appearance. The proper choice depends to some extent on the type of base art which is being used and the form of the 3-D image embedded therein and is thus best determined by trial and error.

As shown in block 65, it is necessary to have a bookkeeping procedure to determine the location of the beginning and ending of each gap so that a blend of pixels can be made to soften the edges of the transition. Further detail is provided in FIG. 6 described below.

As seen in block 67, picture elements are blended, i.e., matched or transitioned to neighboring picture elements. The detailed method of blending is included in full detail in FIG. 6. The blending method shown in FIG. 6 and equivalents thereto is referred to as the method of checkered commissure. Block 69 shows the end of the two loops.

EXAMPLE 2

Referring now to FIG. 6, there is shown a flow chart depicting one embodiment of the invention. As shown in block nos. 117–135, the method of checkered commissure is used to blend picture element colors at the edge of each gap. The checkered commissure method is associated with the associated equations and equivalents thereof.

For each segment of the replacement strip art that is inserted into the gap, the RGB color as a function of x is given the variable IFN(X).

If y is odd:

$$IFN(XSTART)=IFN(XSTART-1)$$

$$IFN(XSTART+2)=IFN(XSTART-1)$$

$$IFN(XEND)=IFN(XEND+1-IXD(XEND-1))$$

$$IFN(XEND-2)=IFN(XEND+1-IXD(XEND-D))$$

If y is even:

$$IFN(XSTART+1)=IFN(XSTART-1)$$

$$IFN(XSTART+3)=IFN(XSTART-1)$$

$$IFN(XSTART-1)=IFN(XEND+1-IXD(XEND-1))$$

$$IFN(XEND-3)=IFN(XEND+1-IXD(XEND-1))$$

XR=???

Other definitions for variables used in this example are:
PIXL is an internal integer variable used as a counter.
SIZE1 is a internal floating point variable.
INC is an internal integer variable.
XSTART is a internal integer variable that is used to represent the starting value of x for a given inserted segment of replacement strip.
XEND is a internal integer variable that is used to represent the ending value of x for a given inserted segment of replacement strip.
XB and XF are internal integer variables used to represent a value of x in internal loops.

D1 and D2 are internal integer variables.
The function (IY MOD 2) returns the remainder of the division of the integer IY by the number 2.

This example shows a blend zone of four pixels. It is preferably applied to resolutions above 300 dpi (dots per square inch).

For lower resolutions (below 300 dpi) this blend zone should be reduced to three pixels. Alternatively, the above equations in blocks 117–123 can be modified to actually blend or color average the R, G, & B values of each pixel across the blend zone. If such an RGB blending is desired, the equations in the above-referenced blocks can easily be modified.

Any of the other disclosed methods of filling the gap, i.e., spliced commissure, lined spliced commissure, or blended commissure could be utilized in place of the checkered commissure method. Referring to FIG. 6, the process was implemented by initializing the necessary variables, block 71.

In block 73, a loop is formed for x ranging from x=IXR1 to IXD−1.

In block 75 the value of the counter is determined and, depending upon whether or not it is less than 0, the value of PIXL is determined, blocks 77–83.

The following is a detailed description of FIG. 6 showing the relationship of the blocks in FIG. 6 to those in FIG. 7.

Block 71 corresponds to FIG. 7, block 47, but also shows some additional internal variable initializations for variables that do not appear in FIG. 7.

Block 73 corresponds to blocks 49 through 51 of FIG. 7, but includes a step involving the internal variable CURINCR which is needed for the depth summation procedure below.

Blocks 75 through 83 correspond to FIG. 7, block 54, and represent a continuation of the depth summation procedure started in block 73.

Block 85 through 87 correspond to block 53 of FIG. 7. This is part of the bookkeeping for the counter "CNTR" used in spliced commissure method of FIG. 7, block 63. Its position could be moved to above block 54, FIG. 7, as shown in FIG. 7 without any effect on the procedure.

Blocks 89 through 91 correspond to FIG. 7, blocks 55 through 57. Note that the statement CURINCR=0 is equivalent to the statement PIXL=0.

Blocks 93 through 95 correspond to FIG. 7, blocks 59 through 61. This is the method of smear. Note that PIXL is a counter not shown in FIG. 7.

Block 97 corresponds to FIG. 7, block 63, and is the method of spliced commissure.

Blocks 99 through 107 correspond to FIG. 7, block 65 and represent the bookkeeping procedure for keeping track of the beginning and end of the gap.

Blocks 109 through 112 are redundant steps that duplicate the method of smear already completed in blocks 93 through 95 of FIG. 6.

Blocks 113 through 135 correspond to FIG. 7, block 67, and represent the checkered differential method of blending pixels at the edges of the gap.

Block 69 corresponds to FIG. 7, block 137, and represents the end of the loop X.

Figure 5A:
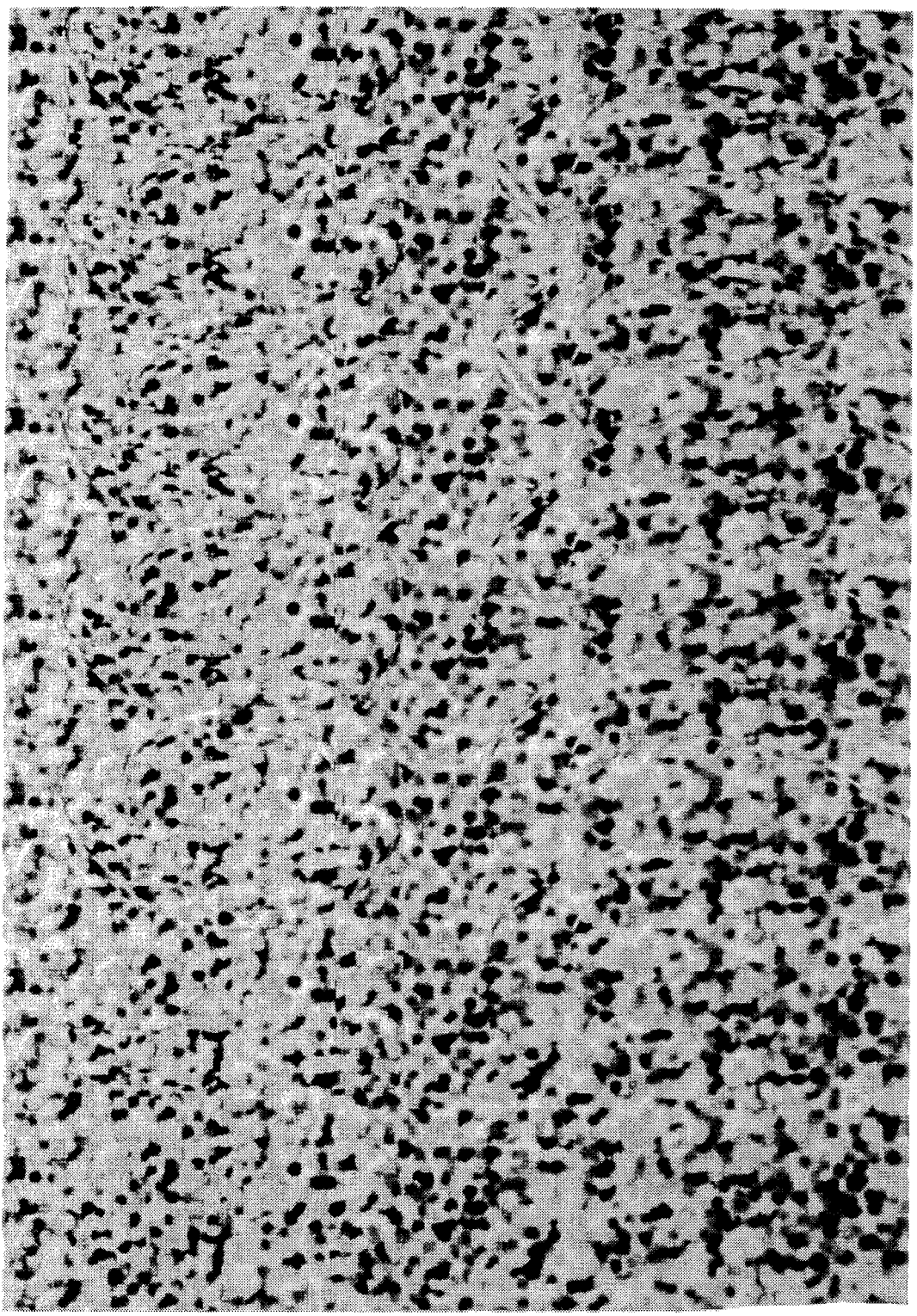
FIG. 5(a) is an illustration of the invention showing the technique of spliced commissure.

FIG. 5(a) shows an example of a micropixel-based stereogram made using the spliced commissure method. It can be seen that descriptive smear lines are avoided through use of this technique, and a better appearance is the result.

Figure 5B:
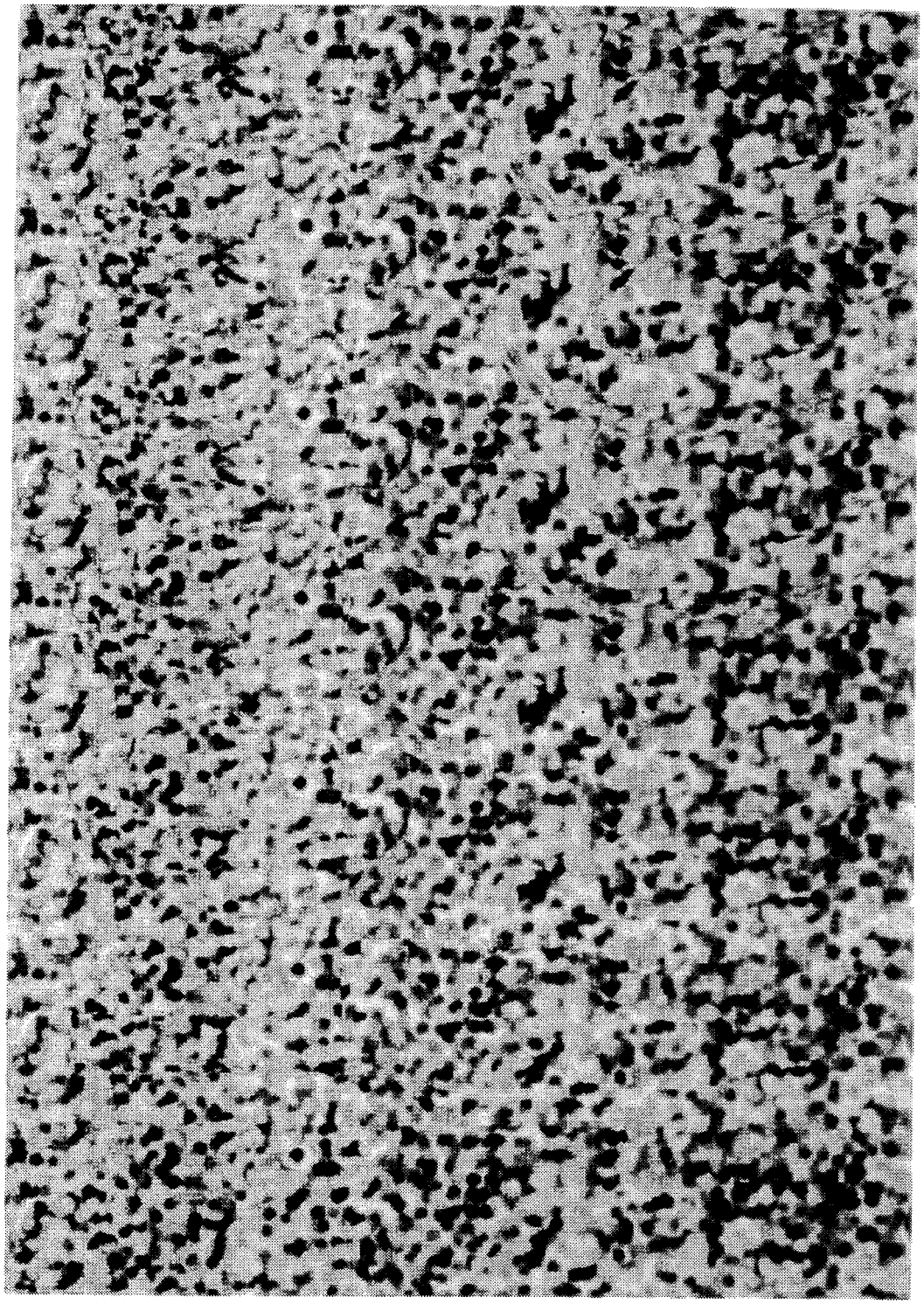
FIG. 5(b) is an illustration of the invention using the technique of lined differential spliced commissure.
Figure 6A:
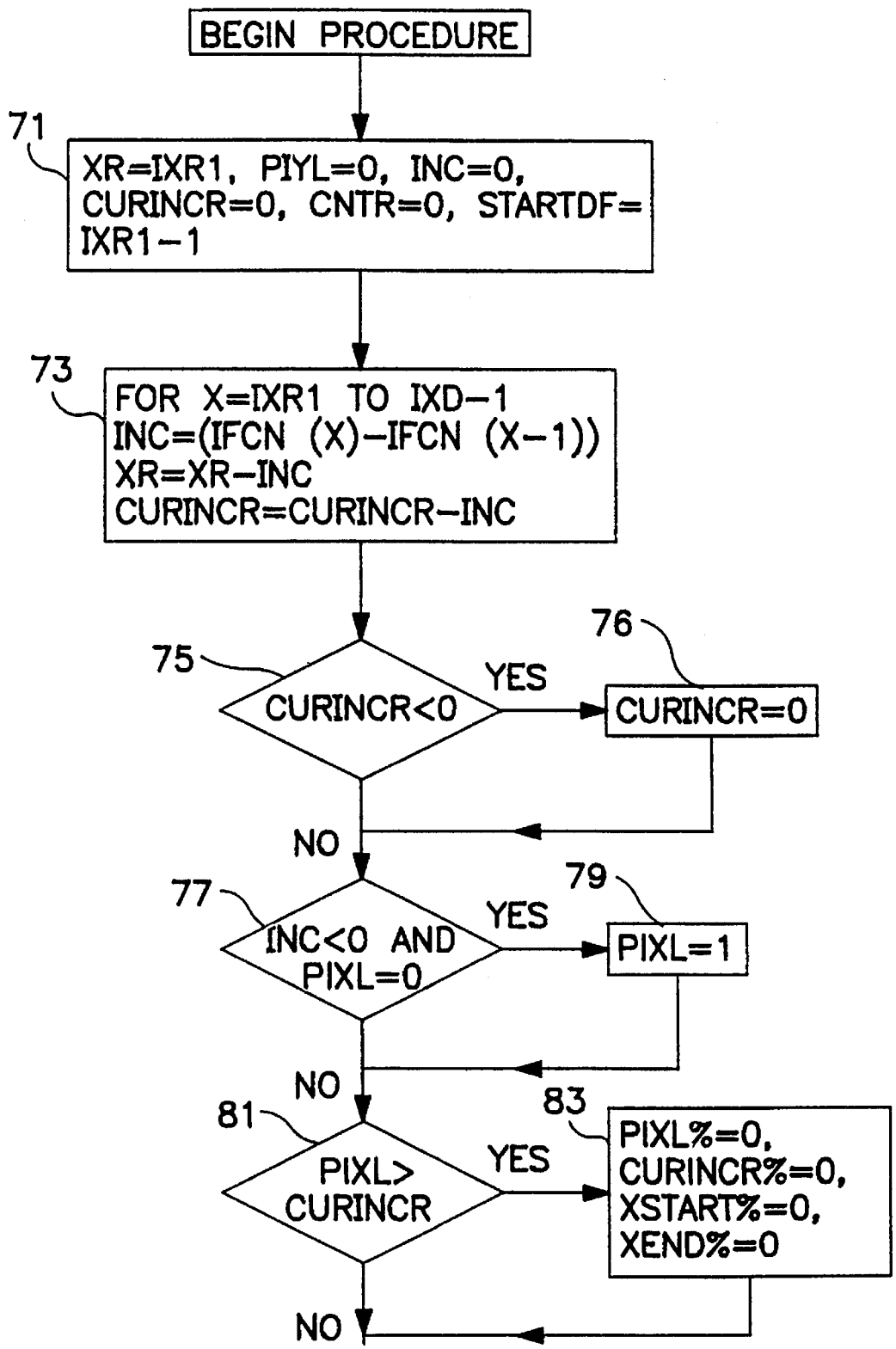
FIG. 6 is a flow chart describing programming for carrying out the invention.
Figure 6B:
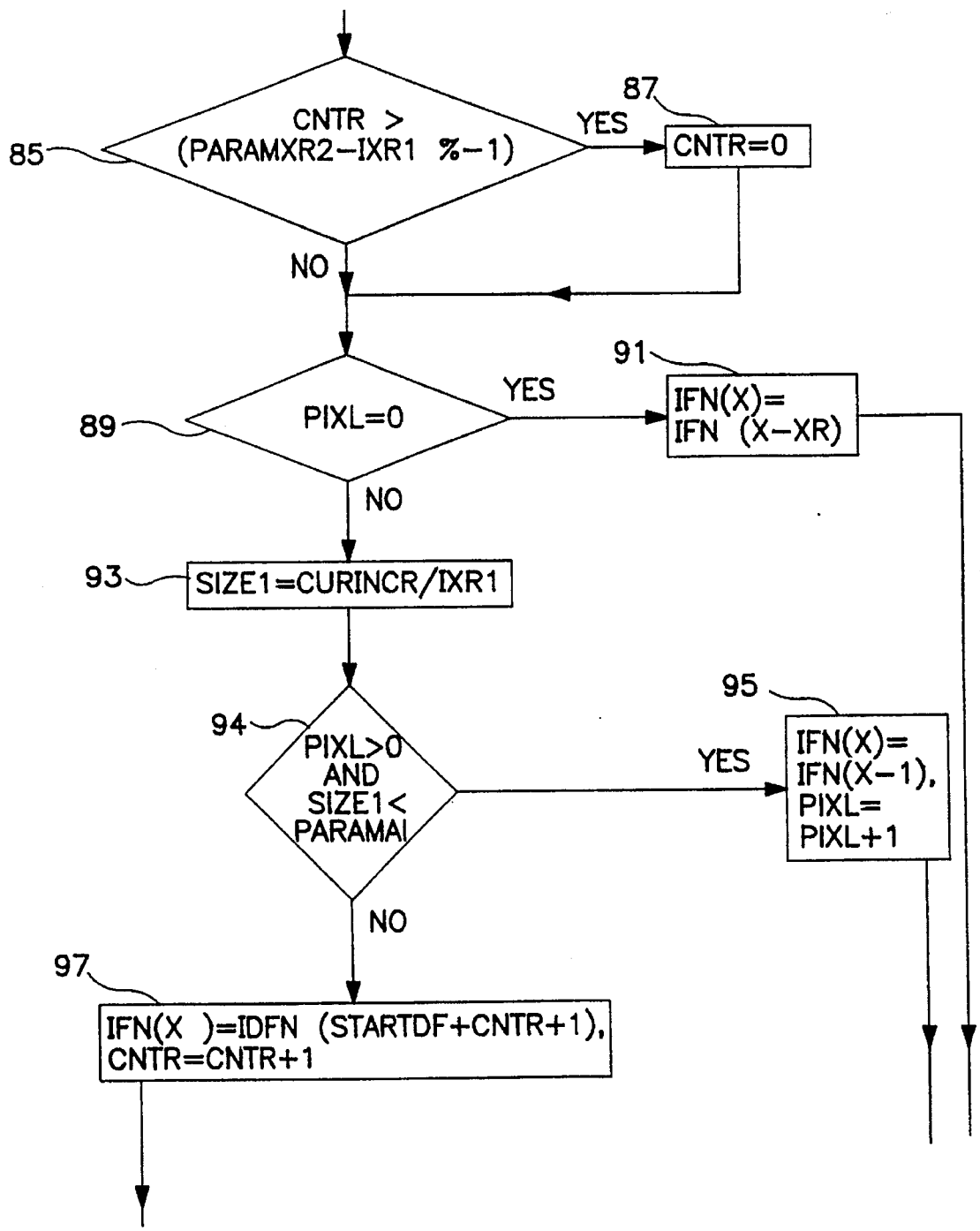
Figure 6C:
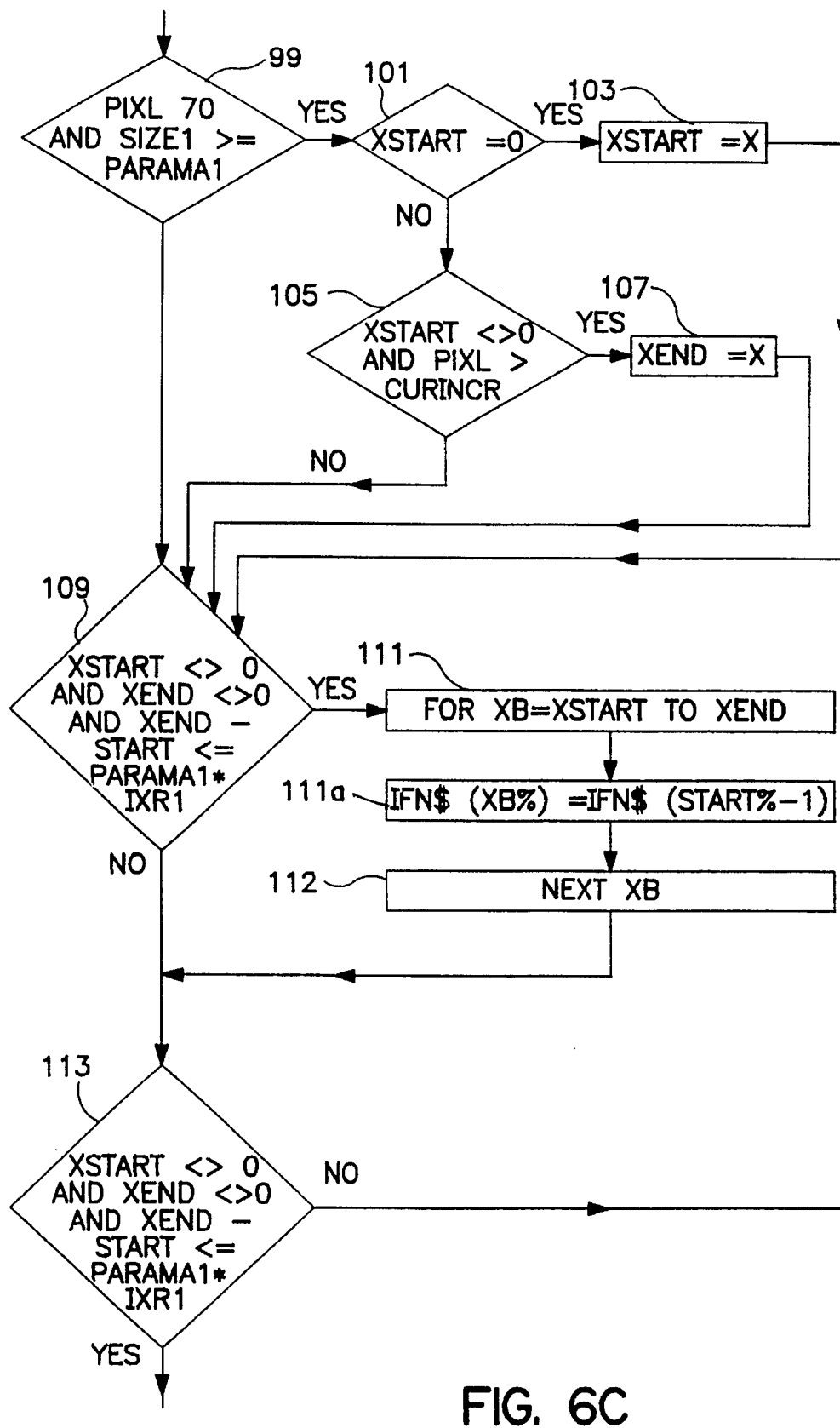
Figure 6D:
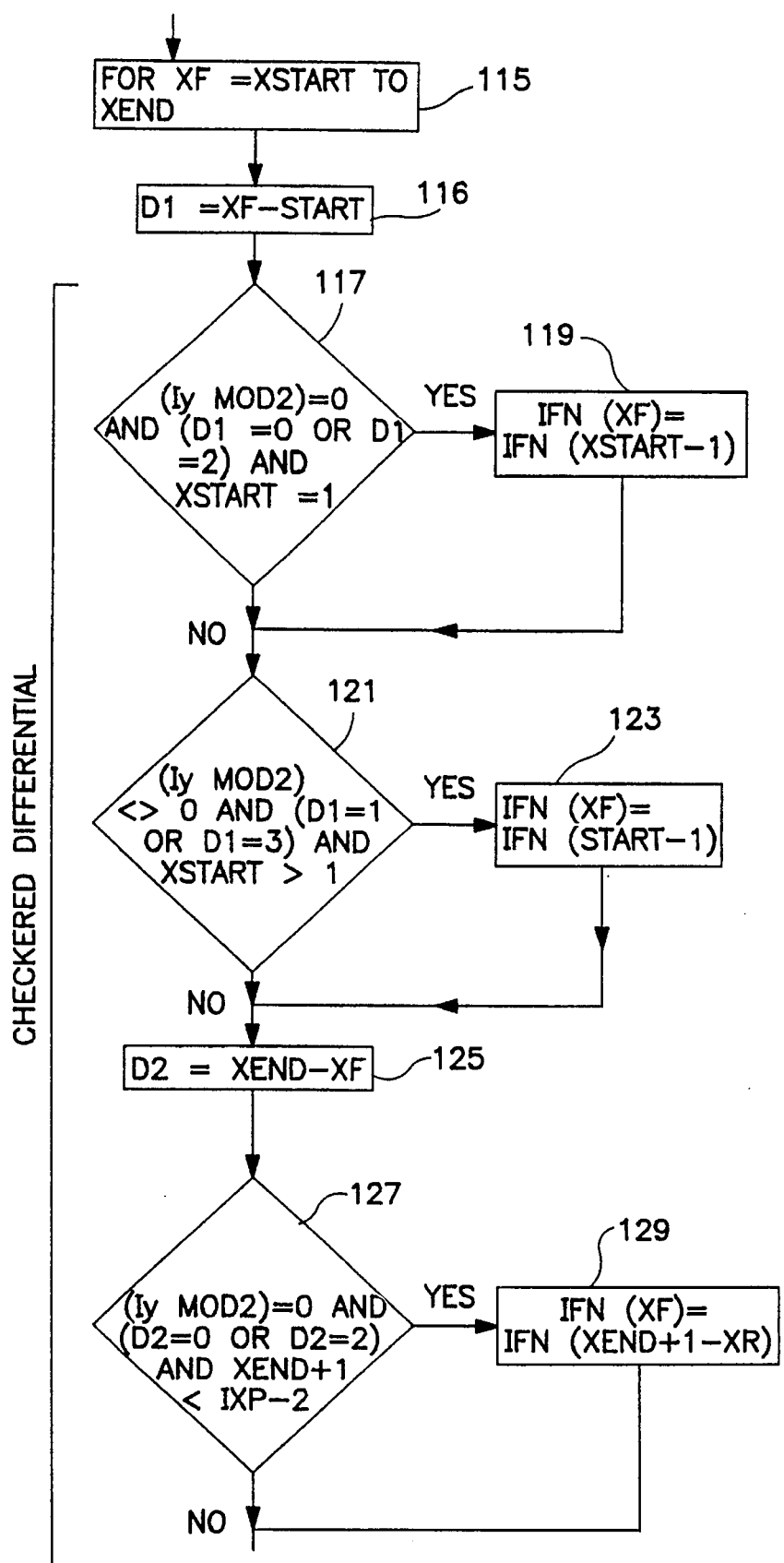
Figure 6E:
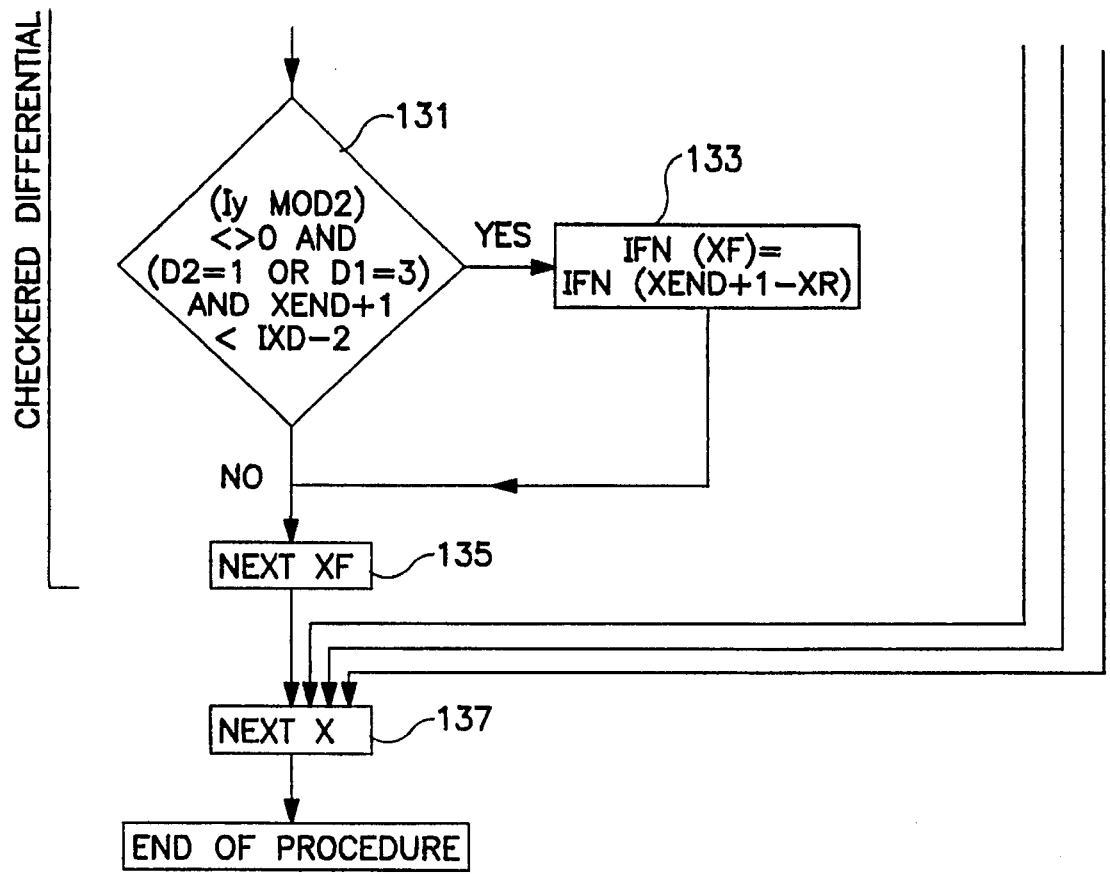

In another embodiment of this invention for use with full color art stereograms, the spliced commissure method is altered somewhat. FIG. 5(b), which shows an example of the lined differential spliced commissure technique, is a variation of the spliced commissure method. This method is a variation of the spliced commissure wherein for each segment of extra art that is added into a gap,

*IFX(XSTART)=IFN(XSTART−1)*

*IFX(XSTART+2)=IFN(XSTART−1)*

*IFN(XEND)=IFN(XEND+1−IXD(XEND−1))*

*IFN(XEND−2)=IFN(XEND+1−IXD(XEND−1))* and equivalents thereof. This method produces a series of gradual transition levels where alternate columns of pixels duplicate the color of the replacement strip and alternate columns duplicate the color of the artwork at the edge of the gap.

In another embodiment of this invention, the RGB color values in the transition zone are a linear average of the color values of the colors of the segment taken from the replacement strip and the color values from the surrounding illustration. Certain fixed weighting factors $F_1$ and $F_2$ are included. This method is referred to as the method of blended differential spliced commissure. The method can be represented by the following equations and equivalents thereof:

Define a function BLEND where BLEND (IFN1, $F_1$, IFN2, $F_2$) is a linear average of the R, G, and B values of IFN1 and IFN2 with fixed weighting factors $F_1$ and $F_2$.

For each segment of the replacement strip that is added to the gap:

IFN(XSTART)=BLEND(IFN(XSTART−1),3,IFN START,1)   (i)

IFN(XSTART+1)=BLEND(IFN(XSTART−1),2,IFN(XSTART+1),2)   (ii)

IFN(XSTART+2)=BLEND(IFN(XSTART−1),1,IFN(XSTART+2),3)   (iii)

IFN(XEND)=BLEND(IFN(XEND+1)−IXD(XEND−1)(,3,IFN(XEND),1)   (iv)

IFN(XEND−1)=BLEND(IFN(XEND+1)−IXD(XEND−1)),2,IX−N(XEND−1),2)   (v)

IFN(XEND−2)=BLEND(IFN(XEND+1)−IXD(XEND−1)),1,IF−N(XEND−2),3)   (vi)

The blend zone for this method has been chosen as four pixels which is effective for pixel resolution levels above 300 dpi. For lower resolutions, the blend zone should be reduced to three picture elements and equations (ii) and (vi) above would be omitted.

The inputs to the flow chart shown in FIG. 6 consist of base art color and depth contour information. The definitions at pp. 38–39 above apply.

It is also possible to use base art that is represented in perspective or foreshortened format to enhance the three-dimensional effect of the stereogram. The use of perspective drawing alters the relative depth appearance of the objects in the drawing. The use of such a drawing in connection with stereogram images can, therefore, enhance the 3-D effect.

Far Stereogram

Figure 8C:
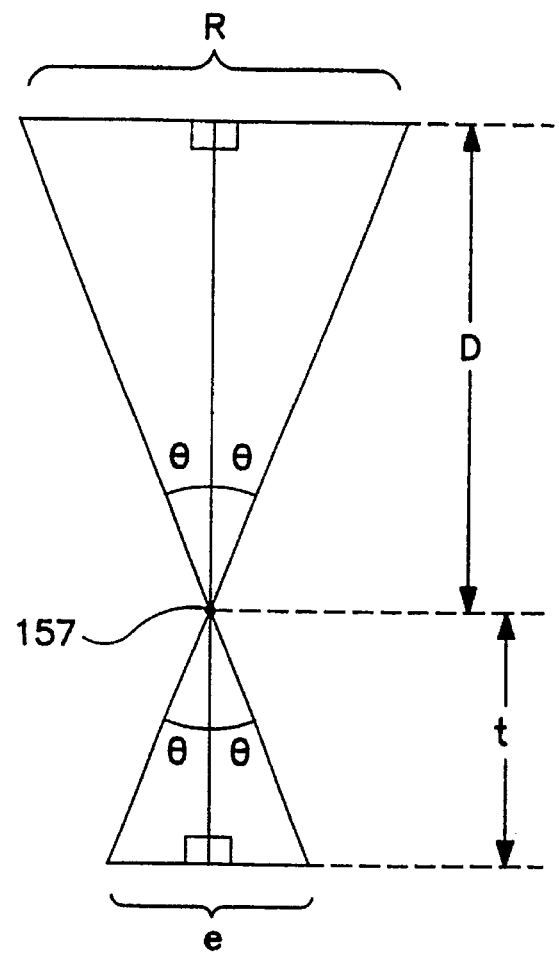
Figure 8D:
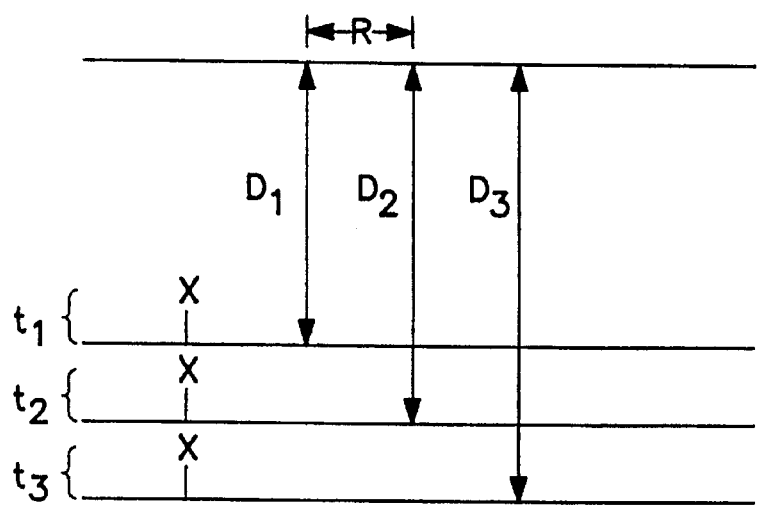

FIGS. 8(*a*) and 8(*b*) shows another embodiment of this invention. FIG. 8(*a*) shows a graph of a traditional stereogram 141 designed to be viewed by an observer located within a few feet of the stereogram. Panels A–E in the Figure represent repeating bands having an initial repeat width, 144. The colored squares 143 which appear in the graph represent a shift in the region of the B panel to create the illusion of 3-D. The shift must be repeated in panels C–E to avoid presenting a double image. The circle 145 represents another shift which must be repeated to the right as well. The two lines of sight 147 and 149 will cross at some point behind the stereogram 141 depicted in FIG. 8(*a*).

By contrast the far stereogram 151 shown in FIG. 8(*b*) is viewed from a greater distance than the near stereogram, and the left line of sight 153 crosses the right line of sight 155 in front of the far stereogram. In addition, the initial repeat width, 157, is larger than for the near stereogram, i.e., four inches or more. To view the far stereogram 151, the observer stands at a far enough distance away from the stereogram so that, in viewing it, he crosses his eyes at a point in front of the far stereogram. Contrary to the convention for near stereograms, the dislocations repeat from the right to the left. To obtain the same effect or illusion of depth changes the colored squares 143' and colored circles 145' must repeat along the left. The reason for this reversal is that the lines of sight 153 and 155 have crossed. If the far stereogram 151 were viewed at the same distance as the stereogram 141 shown in FIG. 8(*a*), the raised images would appear recessed and vice versa.

A far stereogram 151 such as this could be used for billboard advertising or theater viewing. In a movie theater or the like, each person is at a different distance away from the screen; this method will nevertheless work from various viewing distances because there is a large range of distances at which the far stereogram 151 will be effective.

Referring now to FIG. 8(*c*), there is shown a schematic diagram of the far stereogram. R represents the base repeat width, e is the separation between an observer's eyes, t is the distance between the observer's eyes to a target and D is the distance from the target to the far stereogram. The target, 157, is placed between the observer's eyes and the far stereogram to serve as a focal point. Note that the distance from the observer's eyes to the far stereogram is D+t.

From the schematic in FIG. 8(*c*), it is determined that $$\tan \theta = \frac{e}{2t}$$

$$\tan \theta = \frac{R}{2D} = \frac{e}{2t}$$

$$\frac{e}{t} = \frac{R}{D}$$

To apply the far stereogram equations to a large billboard or screen, it is observed that for various $D_i$ (distances of different observers), there is a different ti. Since $D_i \gg ti$, $D_i + ti \approx D_i$. t can be represented as a function of D. Note that the repeat width R is fixed because all observers are observing the same billboard or screen.

$$t(D) = \frac{e}{R} D = \frac{e}{R} * D$$

A target is an object placed in the viewing path to assist viewers to focus on the far stereogram. A target could be the top of a stick, for example. The far stereogram is effective for a target length based on an average e for the general population and slight variations in e do not affect one's ability to view the far stereogram. Once e is known, an appropriate target can be set up in the area where the far stereogram will be viewed.

Alternatively, the target distance could be adjusted for various eyes separating distances according to the above formula for t(D). For example, if e were about 0.1 inch less than the normal value of e, the target should be placed closer to the observer by an amount of 0.1"×D/R In a still further embodiment of the invention excellent results can be achieved by superimposing two or more stereograms. In order to superimpose two stereograms, one must be selected as the lower stereogram and the other as the overlay stereogram. Transparency information must be specified for each region of the overlay stereogram. The overlay stereogram is placed on top of the lower stereogram and the transparency information is used to produce a single resultant stereogram. The resultant stereogram can be considered as a new lower stereogram and a new overlay stereogram can be superimposed on it to produce a new resultant stereogram. This process can continue on and on with any number of new overlay stereograms. Transparency information can be specified as a percent.

If a region in the overlay stereogram is 100% transparent, then the color of the resultant stereogram in that region will be the color of the lower stereogram. If a region is 0% transparent then the color of the resultant stereogram in that region will be the color of the overlay stereogram. If a region in the overlay stereogram is X% transparent then color of the resultant stereogram in that region will be an average of the color in the overlay stereogram and the color in the lower stereogram, with weighting factors (100–X) and (X), respectively. (Note that colors can be averaged in the RGB 24 bit representation, for example, by averaging the numerical values of the R, G and B components of the color). In order to produce a pleasing superposition of multiple stereograms it is necessary for an artist to carefully specify transparency information and the order in which the stereograms are to be overlaid so that areas that appear higher to an observer are actually on top of areas that appear lower. Otherwise an unpleasing resultant stereogram may be produced that will be confusing to the eyes of an observer.

Figure 9:
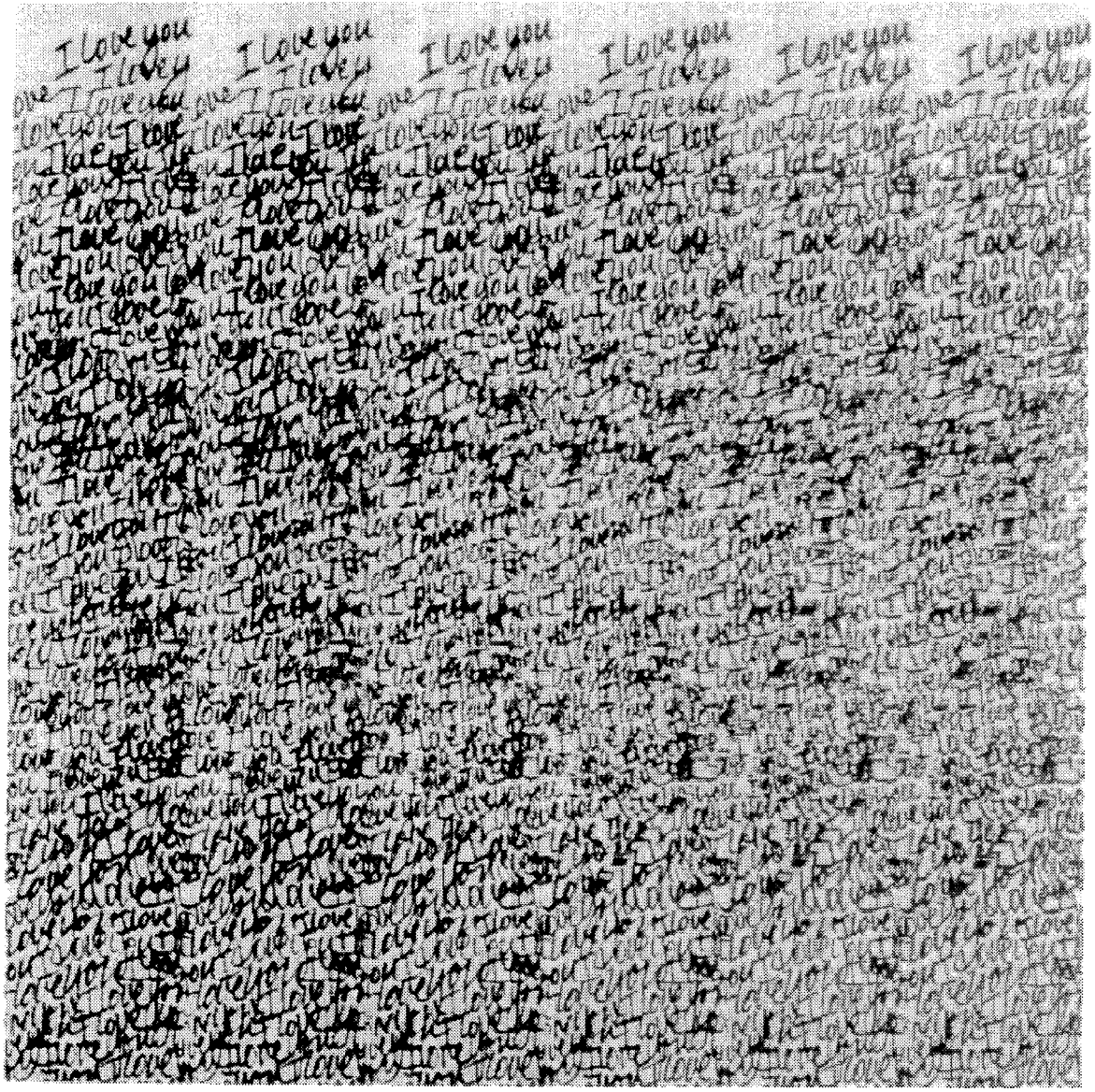
FIG. 9 is a lower stereogram made according to the invention.
Figure 10:
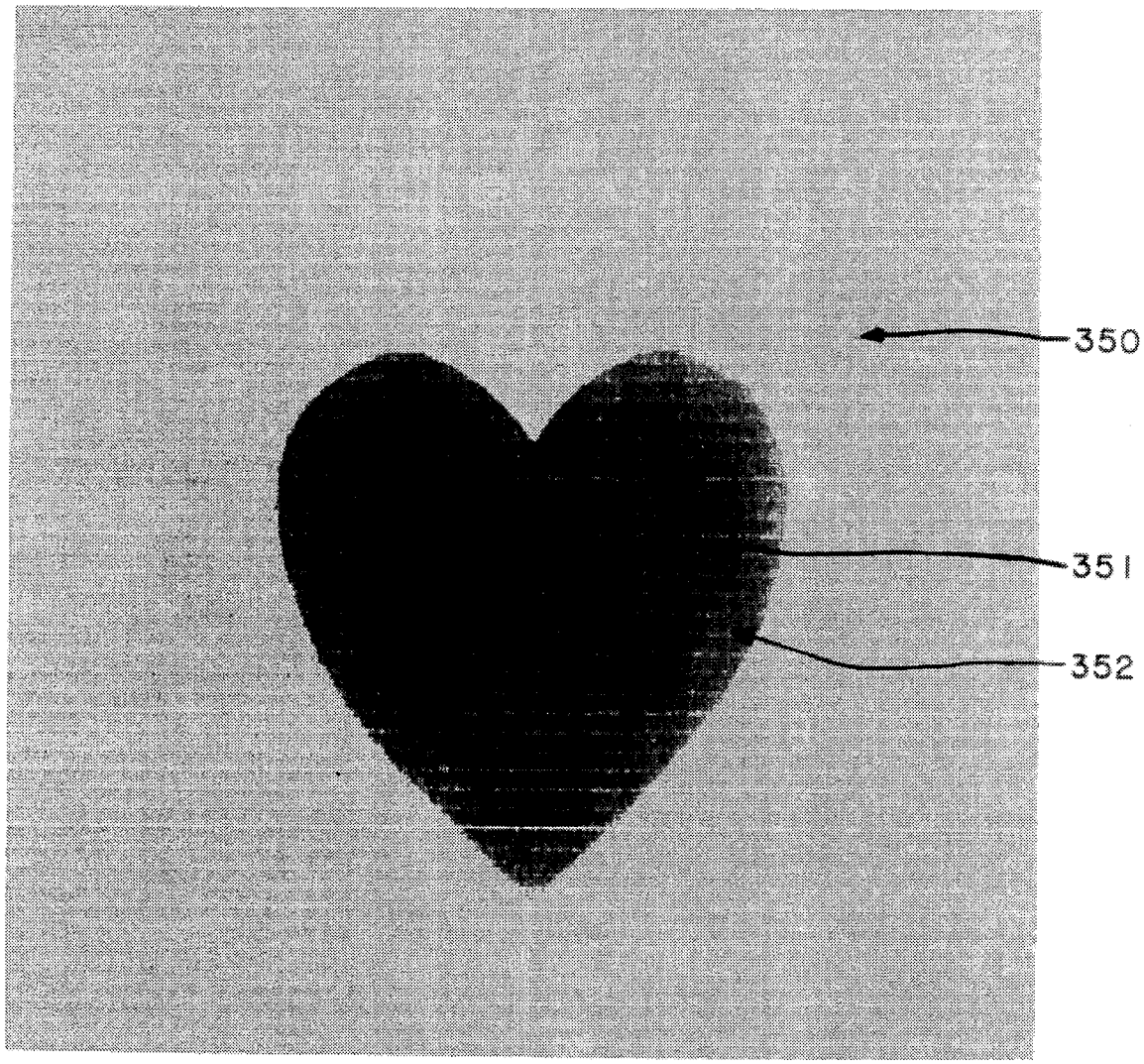
FIG. 10 is a grey scale representing the depth information in the production of FIG. 9.
Figure 12:
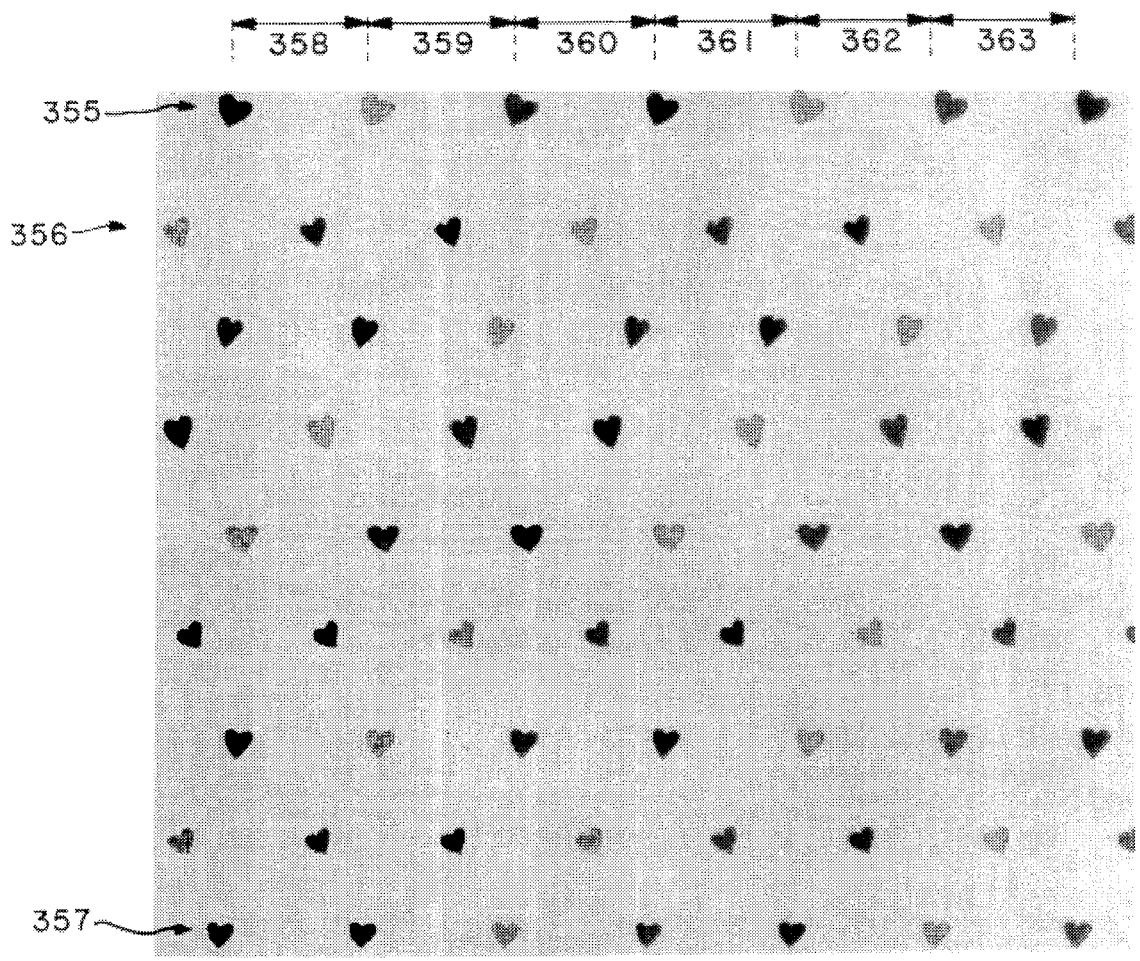
FIG. 12 is an overlay stereogram.
Figure 13:
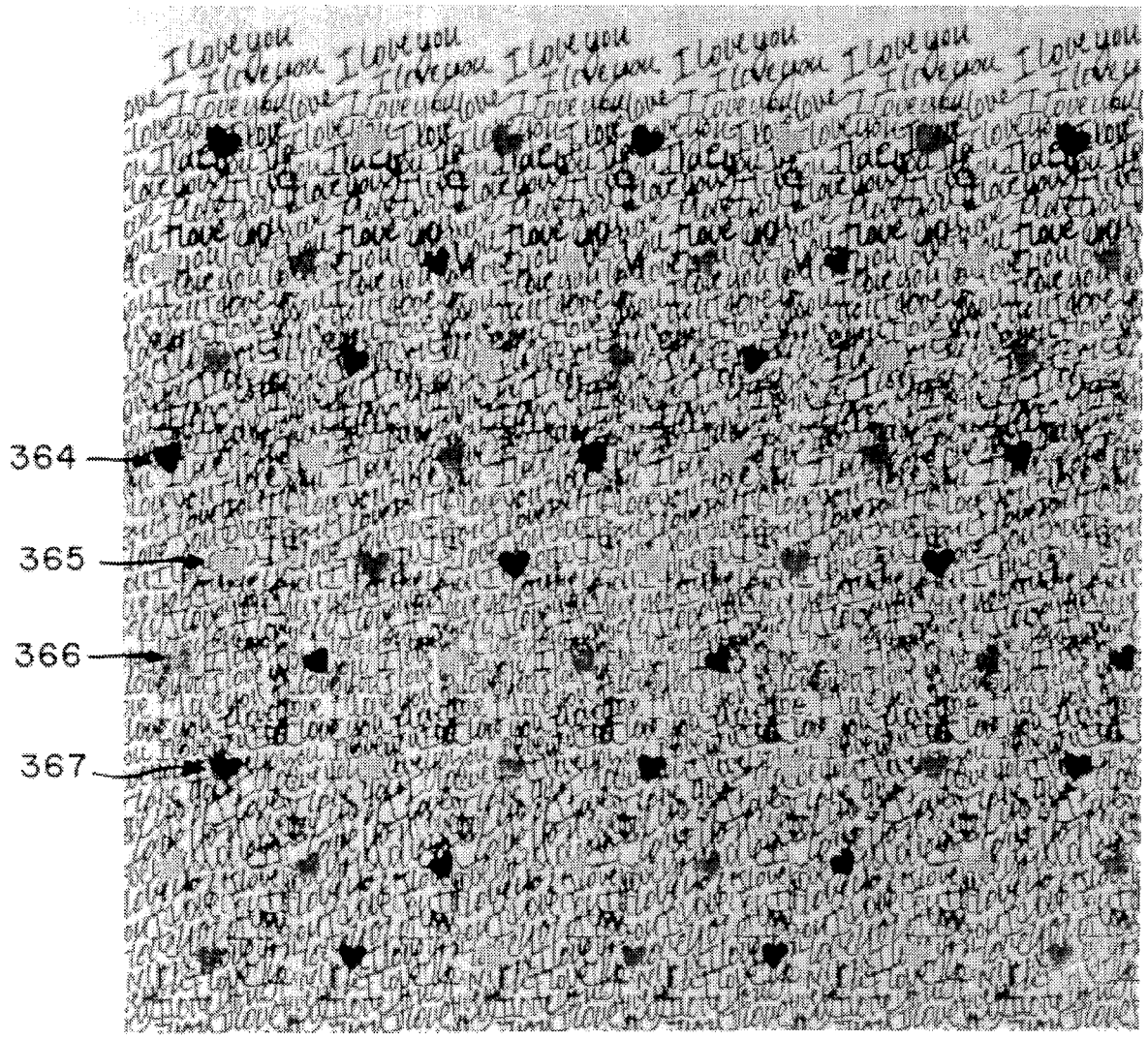
FIG. 13 is a resultant stereogram obtained from the superposition of the stereogram of FIG. 9 overlaid by the stereogram of FIG. 12.

As best seen in FIG. 13 the stereogram depicted there was the resultant stereogram from the superposition of the stereogram in FIG. 9, the lower stereogram, and the stereogram in FIG. 12, the overlay stereogram. All the hearts that appear in FIG. 12 are 0% transparent and all the space between the hearts are 100% transparent. As described below, the stereogram in FIG. 12 was created by a procedure within the program Corel Draw. The stereogram shown in FIG. 9 was imported into Corel Draw (as an RGB 24 bit color TIF file) and placed in the back of the objects comprising the stereogram in FIG. 12. By default, in Corel Draw, colored objects appear opaque (that is 0% transparent) with respect to images behind them. Notice that the rows of hearts, 364, 365, 366, 367 in FIG. 13 that overlay on top of the large heart image in the background (which is seen when properly viewed by an observer) were produced in a way to appear to be higher then large heart image. The description of how this was done appears below. FIG. 10 is a grey scale illustration of the depth information used in the production of the stereogram in FIG. 9. The background tone in FIG. 10, 350, is a 50% tone and represents the background level of the base stereogram, which can be considered at zero depth. Zero depth means that it is not raised or lowered. The tone on the face of the heart shape, 351, is approximately a 77% tone which represents a raise in the level of that region above the background level. The tone on the edge of the heart shape, 352, is approximately a 60% tone which represents less raise in the level of that region above the background level then that of the face of the heart. The grey scale image, FIG. 13, was created by an artist who airbrushed the image on paper, which was then scanned into digital form by means of a desktop scanner (HP model IIc) and imported into a photo editor program (Adobe Photoshop) for touch up, sizing and positioning.

Figure 11:
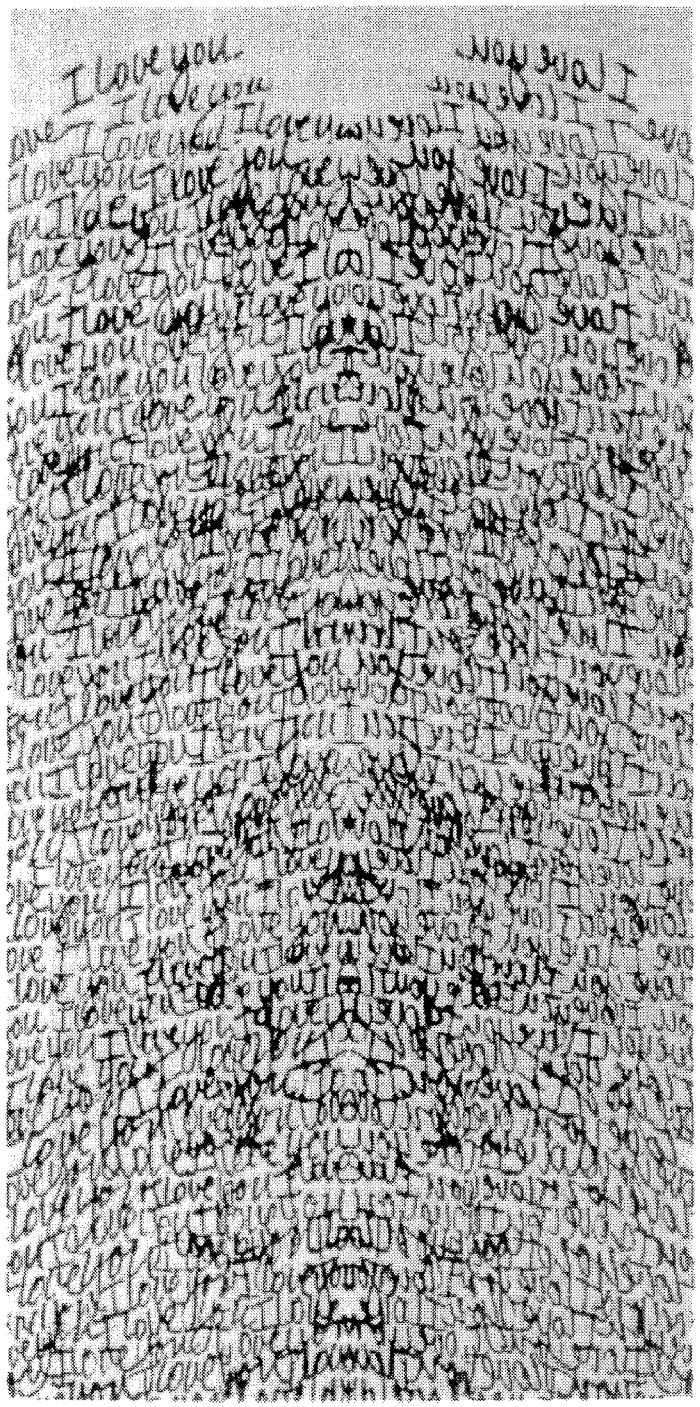
FIG. 11 is a strip of art, a section of which was repeated to form the stereogram base which was used in the production of FIG. 9.

Referring now to FIG. 11, 353, there is shown the strip of art which was repeated to form the stereogram base, and the replacement strip, 354, segments of which are provided for use in the stereogram production procedure. The art in FIG. 11 was prepared in a edit program (Adobe Photoshop) from artwork that had been scanned into digital form (RGB 24 bit color) by means of a desktop scanner (HP model IIc).

The example process illustrated in part by FIGS. 6 and 7 and explained in the text herein was used in the production of the stereogram in FIG. 9. The image in FIG. 10 is 2160 pixels wide and 2160 pixels high. The image in FIG. 9 is also 2160 pixels wide and 2160 pixels high. The section of FIG. 11, 353, is 360 pixels wide and the section of FIG. 11, 354, is 720 pixels wide (width being measured from left to right). The maximum depth displacement represented as a fraction of the base repeat widths was set equal to 0.20. This maximum depth displacement corresponds to a 100% tone in the grey scale image which is used to code for depth. Since the darkest tone in FIG. 10, 351, is approximately 77% tone, the maximum raised level that should appear in the stereogram, FIG. 9, is approximately 0.77×0.20×360 pixels which equals 55 pixels (rounding down to the nearest integer). 55 pixels corresponds to about 0.18 inches, which represents a repeat width of 1.20 inches less 0.18 inches equaling 1.02 inches.

Referring now to FIG. 12 the stereogram was created with the vector based drawing program Corel Draw. A single heart was created, duplicated and the duplicate was placed 1 inch to the right, successively, seven times. Then the hearts were filled with colors chosen by the artist to form the top row of hearts, 355, in FIG. 12. A second row of hearts, 356, was created in a similar fashion except that the duplicates were placed at slightly less then 1 inch (about 0.95 inch). This row, 356, appears to be raised relative to the other row, 355, when viewed by an observer. In a similar fashion the other rows were created. (Notice that the bottom row, 357, is missing the last heart on the right hand side. This omission has nothing to do with the process described herein, since the artist who created this stereogram merely intended that an emblem unrelated to this process be later overprinted in this vacant area where the last heart should have been positioned.) Note that the stereogram show in FIG. 12 was produced by a process that did not involve the use of a pixel representation.

Figure 14:
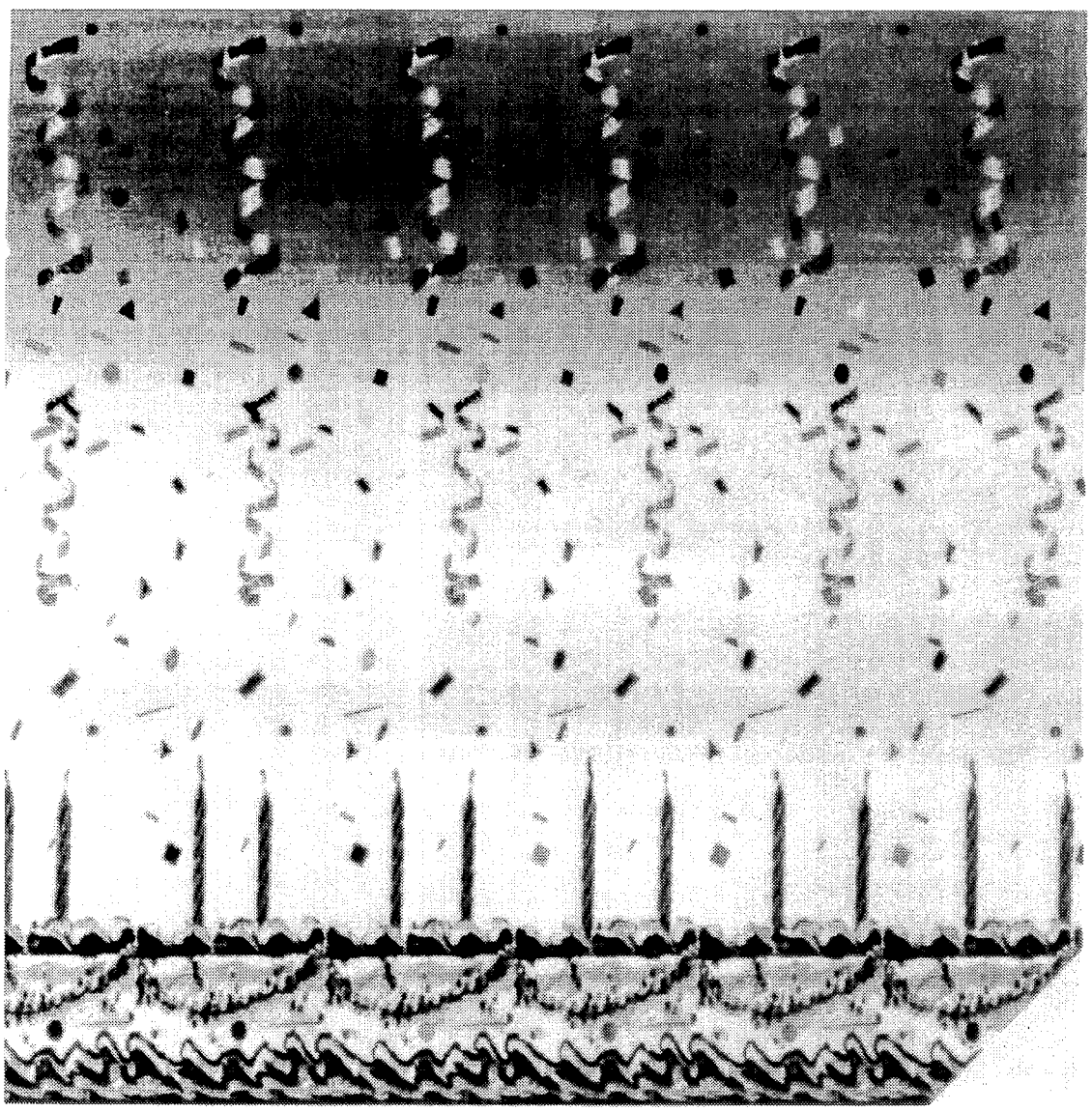
FIG. 14 is a stereogram which utilizes the stepping procedure.

An additional stepping procedure can be incorporated into the process just described in the production of the stereogram in FIG. 12, that can create very dramatic results. Consider the top row of hearts, 355. Notice that the spacing between each heart, 358 through 363, are all exactly the same. It was discovered that a variation in just one of these spacings by as little as 0.02" can easily be seen by an observer viewing the stereogram. A larger variation in such a spacing is even easier for an observer to see. But what does an observer see? To answer this question let us suppose that the spacing, 361, is reduced to 0.95 inch from it's initial value of 1 inch but the other spacings, 358, 359, 360, 362, 363 remain unchanged from their values of 1 inch. In such a situation, one single heart from the top row, 355, appears raised relative to the other hearts in that row. In fact, in such a situation, the raised heart will appear raised to the level of second row, 356. Although this situation is not visually illustrated for an observer to view in FIG. 12, the application of this stepping procedure to produce a stereogram is shown in FIG. 14. Consider the row of birthday streamers, 368, in FIG. 15. (In order to keep FIG. 14 intact for viewing by an observer, FIG. 15 shows the identical stereogram as FIG. 14, except that it has been overlaid with reference numbers).

Figure 15:
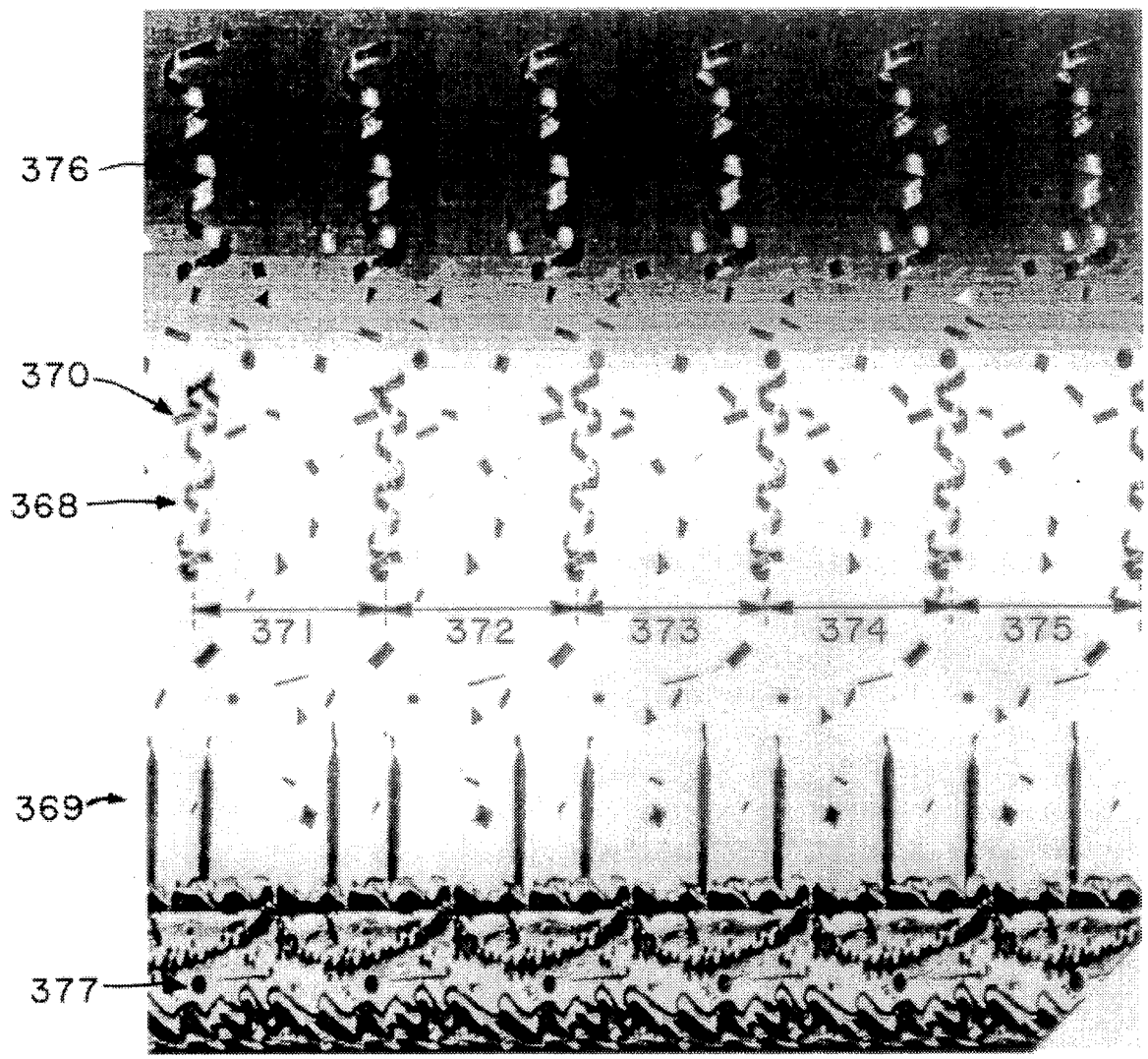
FIG. 15 is the stereogram of FIG. 14 with reference numerals.

The spacings between the individual streamers in the row of birthday streamers, 368, in FIG. 15, are labeled as 371, 372, 373, 374, 375, and they have approximate values of 1.3, 1.3, 1.25, 1.19, 1.3 inches respectively. Notice that two of the birthday streamers in this row appear raised relative to the others, one being raised more then the other. Starting from the right, the first three birthday streamers appear to be in the background, the forth appearing stepped upward toward the observer, the fifth appearing stepped up even further towards the observer, and the last two appearing stepped back toward the background (notice that 7 birthday streamers appear to an observer viewing the stereogram even though there are only 6 printed on row 368. This has to do with an optical illusion.)

Figure 16:
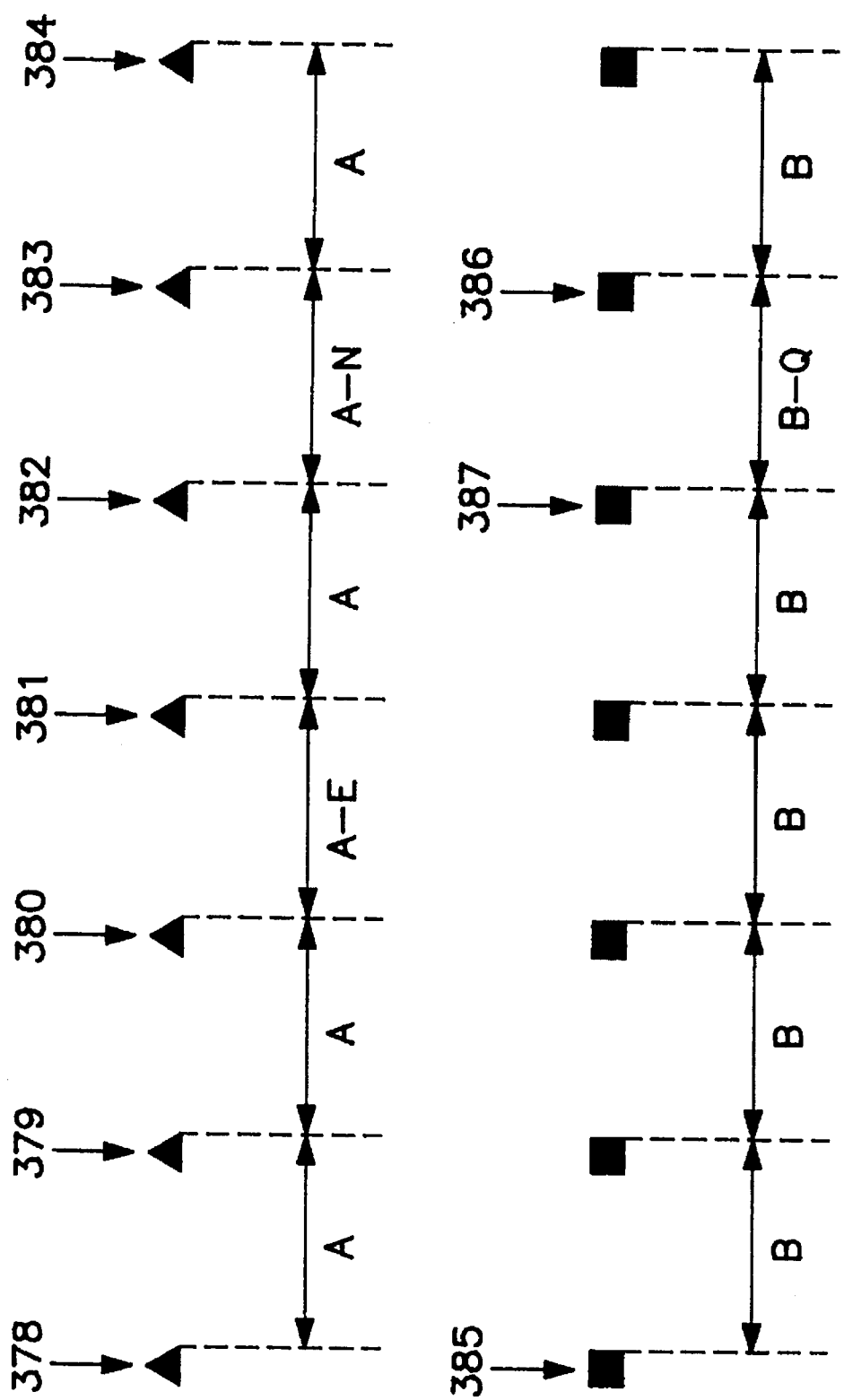
FIG. 16 is a graphical representation of the stepping procedure.

The stepping procedure is illustrated in symbolic form in FIG. 16 (which is not drawn to scale), depicting a row of 7 small triangles. The number seven was chosen arbitrarily since any number greater then three would suffice. The spacing between like corners of triangles 378 and 379 is A. Likewise for triangles 379 and 380, 381 and 382, 383 and 384, the spacing is A. The spacing between like corner of triangles 380 and 381 is A–E, and likewise between 382 and 383 is A–N. A, E, N, B, and Q all have the same units of length and A>N, A>E, and B>Q. To an observer of a stereogram based on the specifications in this FIG. 16, the triangle 381 will appear raised by an amount proportional to E/A if E is positive or lowered by an amount proportional to E/A if E is negative. (Due to the fact that each eye is seeing a different triangle, creating an optical illusion of an extra triangle, there is some ambiguity as to whether it is triangle 380 or 381 that appears raised (lowered). We use the convention that it is the triangle on the right side of the space that is raised (lowered)). Likewise the triangle 383 will appear raised by an amount proportional to N/A if N is positive or lowered by an amount proportional to N/A if N is negative.

If both E and A are positive then the ratio of the depth (relative to the base of 378 and 379) of triangle 381 to triangle 383 is given by E/A divided by N/A which is E/N. As seen in FIG. 16, the row of squares starting with 385 have equal spacing between like corners of the squares of an amount B except for 387 and 386 with have a spacing of B–Q. All the squares starting with 385 except for 386 are raised, relative to the triangles 378 and 379, by an amount proportional to (A–B)/A if B<A. All the squares starting with 385 except for 386 are lowered, relative to the triangles 378 and 379, by an amount proportional to (B–A)/A if B>A. All the squares starting with 385 except for 386 are at the same height, relative to the triangles 378 and 379, if B=A.

We shall now consider the case in FIG. 16 where E, N, and Q are positive and B<A. Other cases easily follow with minor sign changes as can be seen from the description above. Square 386 is raised by an amount proportional to Q/B compared to the other squares and by an amount proportional to [A–(B–Q)]/A compared to triangles 378 and 379. Triangle 383 is higher than square 386 if (N/A)>[A–(B–Q)]/A and in such a case would overprint 386 if the rows were close enough to result in overlap.

By combining the stepping procedure with method of superimposing (as described above), the stereogram in FIG. 15 was produced. Referring now to FIG. 15, the small piece, 370, overprints 368 because the spacing between the row of small pieces starting with 370 is less than the spacing between the row of pieces starting with 368 and therefore 370 appears higher than 368. The proper transparency specifications and order of overlay for the superposition of more complex stereograms can be calculated by making use of the formulas of the stepping procedure as described above.

Note that the spacing of each of the rows of hearts, 364, 365, 366, 367, in FIG. 13 is less than or equal to 1", which ensures that these hearts will appear above the big heart image under them (when viewed by an observer); since the repeat width of the face of the big heart was shown to be greater than 1.02", approximately. The link between spacing, as discussed in the stepping procedure, and repeat width, as discussed in the computer generated stereograms above, provides the key to the comparison of depth in the situation where stereograms produced by different methods are superimposed, one over the other.

Notice that the oval shaped row of dots 377, FIG. 15, vary in color across the row and yet do not interfere with the perception of depth. It is the spacing of the shapes of boundaries of solid colored picture elements that determine the depth perception, the colors of each shape being combined by the eye to form yet other varying colors across the row. This technique of color variation which can be referred to as color independence is useful to improve the appearance of stereograms. The production of the stereogram in FIG. 15 made use of both Corel Draw and Adobe Photoshop programs. The starting lower stereogram in the production of the stereogram in FIG. 15 was the row of candles 369 which was produced in Adobe Photoshop from candle photo's that had been digitized into 24 bit RGB color by a desktop scanner. Use of a number of Adobe Photoshop tools including selection, copying, pasting, moving and canvas width increase were used to produce this lower stereogram as well as the overlay stereogram of the cake which surrounds 377 and the overlay stereogram of both rows of birthday streamers (368 being one such row). The other rows of objects were created within Corel Draw, exported in TIF format, and imported and overlaid on the lower stereogram by means of the same Abode Photoshop Tools mentioned above.

The blended background, 376, was then added by selecting the formally white background and using the blend fill tool in Abode Photoshop. Note that the soft blend, 376, containing no horizontal variation in color cannot display any stereographic depth perception. Yet 376 appears as if it is in the background. This effect, which is do to an illusion of the eye, can be referred to as virtual depth, and it is useful in the production of stereograms to enhance their beauty.

The foregoing describes the invention in terms of both discrete and continuous art representations and is intended to encompass both manual methods of constructing stereograms, and manually constructed stereograms.

While the invention has been described with respect to certain embodiments thereof, it will be apparent to those skilled in the art that various changes and modifications may be made without departing from the spirit and scope of the invention.

I claim:

1. A computer implemented process for making a stereogram comprising the steps of:
   (a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap;

(f) for all first picture elements in a gap, assigning to such first picture elements the color information of an adjacent picture element in the same horizontal row or the color information of a replacement strip of continuous tone artwork;

(g) determining the width of the gaps;

(h) comparing the width of each gap to a prescribed threshold; and, (i) if the width of a gap is less than the prescribed threshold, assigning to the first picture elements in such a gap the color information of the adjacent picture element in the same horizontal row.

2. The process of claim 1, wherein in step (i) the first picture elements in such a gap are assigned the average color information of the picture elements adjacent to the first picture elements in the same horizontal row.

3. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap;

(f) for all first picture elements in a gap, assigning to such first picture elements the color information of an adjacent picture element in the same horizontal row or the color information of a replacement strip of continuous tone artwork;

(g) determining the width of the gaps;

(h) comparing the width of each gap to a prescribed threshold; and, (i) if the width of a gap is equal to or greater than the prescribed threshold, assigning to the first picture elements in such a gap the color information of the replacement strip of continuous tone artwork.

4. The process of claim 3, wherein in step (i) the first picture elements in such a gap are assigned the color information of the adjacent picture elements in the same horizontal row flipped over in a mirror image.

5. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap;

(f) for all first picture elements in a gap, assigning to such first picture elements the color information of an adjacent picture element in the see horizontal row or the color information of a replacement strip of continuous tone artwork;

(g) determining the width of the gaps;

(h) comparing the width of each gap to a prescribed threshold; and, (i) if the width of a gap is less than the prescribed threshold, assigning to the first picture elements in such a gap the color information of the adjacent picture element in the same horizontal row; or, (j) if the width of a gap is equal to or greater than the prescribed threshold, assigning to the first picture elements in such a gap the color information of the replacement strip of continuous tone artwork.

6. The process of claim 5, wherein in step (j) the first picture elements in the gap equal to or greater than the prescribed threshold are assigned the color information of the adjacent picture elements in the same horizontal row flipped over in a mirror image.

7. The process of claims 1, 3 or 5, wherein the picture elements are pixels.

8. The process of claims 1, 3 or 5, wherein the picture elements are vector-based representations.

9. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap; and, (f) for all first picture elements in a gap, assigning to such first picture elements the color information of an adjacent picture element in the same horizontal row or the color information of a replacement strip of continuous tone artwork, wherein the color information further comprises transparency information.

10. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap; and, (f) for all first picture elements in a gap, assigning to such first picture elements the color information of an adjacent picture element in the same horizontal row or the color information of a replacement strip of continuous tone artwork, wherein two or more stereograms are produced and superimposed one over the other.

11. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap; and, (f) for all first picture elements in a gap, assigning to such first picture elements the color information of an adjacent picture element in the same horizontal row or the color information of a replacement strip of continuous tone artwork, wherein the color information of the replacement strip of continuous tone artwork is assigned the color information of the picture elements in the same horizontal row flipped over in a mirror image.

12. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap; and, (f) for all first picture elements in a gap, assigning to such first picture elements the color information of an adjacent picture element in the same horizontal row or the color information of a replacement strip of continuous tone artwork, wherein the picture elements in a gap form one or more contiguous regions and assigning to a contiguous region the linear average of the color values of the adjacent picture element in the same horizontal row and the contiguous region.

13. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap; and, (f) for all first picture elements in a gap, assigning to such first picture elements the color information of an adjacent picture element in the same horizontal row or the color information of a replacement strip of continuous tone artwork, wherein the picture elements in a gap form one or more contiguous regions and assigning to a contiguous region the color information of the replacement strip created by a method of checkered commissure.

14. A computer implemented process for making a stereogram comprising the steps of:

(a) inputting to a computer color information of continuous tone artwork and assigning the color information to picture elements arranged as a plurality of adjacent picture elements in a plurality of horizontal rows;

(b) inputting to the computer depth information and assigning the depth information to the picture elements;

(c) selecting a plurality of first picture elements;

(d) selecting a plurality of second picture elements and assigning to the first picture elements the color information of the second picture elements, wherein a first picture element is assigned the color information of a second picture element located on the same horizontal row and separated from the first picture element by a distance that depends on the depth information assigned to the picture elements in the same horizontal row;

(e) determining if a first picture element is in a gap; and, (f) for all first picture elements in a gap, assigning to such first picture elements the color information of an adjacent picture element in the same horizontal row or the color information of a replacement strip of continuous tone artwork, wherein the picture elements in a gap form one or more contiguous regions and assigning to a contiguous region the color information created by a method of lined differential spliced commissure.

* * * * *

UNITED STATES PATENT AND TRADEMARK OFFICE
CERTIFICATE OF CORRECTION

PATENT NO. : 5,594,841
DATED : Jan. 14, 1997
INVENTOR(S) : Schutz, Stephen A.

It is certified that error appears in the above-identified patent and that said Letters Patent is hereby corrected as shown below:

Drawing:
Delete Fig. 8B, and replace with Fig. 8B as shown the attached page.

Title page, column 2, item [56], line 7, please delete "Ramdon" and replace therefor with --Random--.

Column 1, line 25, please delete "for" and replace therefor with --far--.

Column 4, line 32, please delete "smoothly slowly" and replace therefor with --smooth slowly--.

Column 12, line 58, please delete "in the forms" and replace therefor with --forms--.

Column 16, line 10, please delete "used" and replace therefor with --use--.

Column 16, line 32, please delete "$\leq 1$" and replace therefor with --$\leq 1$--.

Column 16, line 64, please delete "ensure the" and replace therefor with --ensure that--.

Column 18, line 37, please delete "Block 85 through 87" and replace therefor with --Blocks 85 through 87--.

Column 21, line 5, please insert --.-- after "xD/R"

UNITED STATES PATENT AND TRADEMARK OFFICE
CERTIFICATE OF CORRECTION

PATENT NO. : 5,594,841
DATED : Jan. 14, 1997
INVENTOR(S) : Schutz, Stephen A.

It is certified that error appears in the above-identified patent and that said Letters Patent is hereby corrected as shown below:

Column 22, line 46, please delete "show in" and replace therefor with --shown in--.

Column 23, line 47, please delete "with have" and replace therefor with --which have--.

Column 24, line 48, please delete "is do to" and replace therefor with --is due to--.

UNITED STATES PATENT AND TRADEMARK OFFICE
CERTIFICATE OF CORRECTION

PATENT NO. : 5,594,841

DATED : Jan. 14, 1997

INVENTOR(S) : Schutz, Stephen A.

Page 3 of 3

It is certified that error appears in the above-identified patent and that said Letters Patent is hereby corrected as shown below:

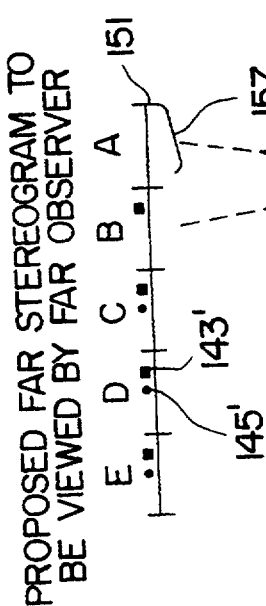
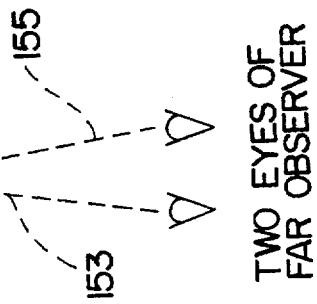

Signed and Sealed this

Sixth Day of April, 1999

Attest:

Q. TODD DICKINSON

Attesting Officer

Acting Commissioner of Patents and Trademarks